United States Patent
Cao

(10) Patent No.: US 11,992,383 B2
(45) Date of Patent: May 28, 2024

(54) SYSTEM FOR FORCE MEASUREMENT UPON ORTHODONTIC APPLIANCES

(71) Applicant: uLab Systems, Inc., Memphis, TN (US)

(72) Inventor: Henry Cao, San Jose, CA (US)

(73) Assignee: uLab Systems, Inc., Memphis, TN (US)

( * ) Notice: Subject to any disclaimer, the term of this patent is extended or adjusted under 35 U.S.C. 154(b) by 0 days.

(21) Appl. No.: 17/658,183

(22) Filed: Apr. 6, 2022

(65) Prior Publication Data

US 2022/0409338 A1 Dec. 29, 2022

Related U.S. Application Data

(60) Provisional application No. 63/214,187, filed on Jun. 23, 2021.

(51) Int. Cl.
*A61C 7/00* (2006.01)
*A61C 7/14* (2006.01)
(Continued)

(52) U.S. Cl.
CPC .............. *A61C 7/002* (2013.01); *A61C 7/146* (2013.01); *A61C 7/20* (2013.01); *A61C 9/0053* (2013.01); *A61C 13/081* (2013.01); *G01L 5/0038* (2013.01); *G01L 5/0042* (2013.01); *A61C 2007/004* (2013.01)

(58) Field of Classification Search
CPC ........... A61C 7/002; A61C 7/146; A61C 7/20; A61C 9/0053; A61C 13/081; A61C 2007/004; G01L 5/0038; G01L 5/0042
See application file for complete search history.

(56) References Cited

U.S. PATENT DOCUMENTS

| 3,521,355 A | 7/1970 | Pearlman |
| 4,068,379 A | 1/1978 | Miller et al. |

(Continued)

FOREIGN PATENT DOCUMENTS

| CA | 2557573 | 7/2012 |
| CN | 1575782 | 2/2005 |

(Continued)

OTHER PUBLICATIONS

Kovach, I. V. et al., "Clinic, diagnosis, treatment, prevention, prosthetics various dentofacial anomalies and deformities," DMA, 2018.

*Primary Examiner* — Octavia Davis Hollington
(74) *Attorney, Agent, or Firm* — Levine Bagade Han LLP

(57) ABSTRACT

Systems for force measurement upon orthodontic appliances are described. Generally, a system for measuring a force or moment imparted by an orthodontic appliance may comprise a dentition mold having one or more target teeth each formed upon a fixture and which is movable independently of the dentition mold, a measurement sensor coupled to the fixture, and a processor in communication with the measurement sensor. An orthodontic appliance may be configured for placement upon the dentition mold where the orthodontic appliance imparts a force or moment upon the one or more target teeth such that the force or moment is transmitted to the measurement sensor via the fixture for measurement of the force or moment.

16 Claims, 13 Drawing Sheets

(51) Int. Cl.
  *A61C 7/20* (2006.01)
  *A61C 9/00* (2006.01)
  *A61C 13/08* (2006.01)
  *G01L 5/00* (2006.01)

(56) References Cited

U.S. PATENT DOCUMENTS

| | | |
|---|---|---|
| 4,597,739 A | 7/1986 | Rosenberg |
| 4,889,485 A | 12/1989 | Iida |
| 4,983,334 A | 1/1991 | Adell |
| 5,055,039 A | 10/1991 | Abbatte et al. |
| 5,186,623 A | 2/1993 | Breads et al. |
| 5,259,762 A | 11/1993 | Farrell |
| 5,506,607 A | 4/1996 | Sanders et al. |
| 5,691,905 A | 11/1997 | Dehoff et al. |
| 5,863,198 A | 1/1999 | Doyle |
| 5,975,893 A | 11/1999 | Chishti et al. |
| 6,120,287 A * | 9/2000 | Chen ............ A61C 7/02 433/2 |
| 6,183,248 B1 | 2/2001 | Chishti et al. |
| 6,210,162 B1 | 4/2001 | Chishti et al. |
| 6,217,325 B1 | 4/2001 | Chishti et al. |
| 6,227,850 B1 | 5/2001 | Chishti et al. |
| 6,227,851 B1 | 5/2001 | Chishti et al. |
| 6,250,918 B1 | 6/2001 | Sachdeva et al. |
| 6,293,790 B1 | 9/2001 | Hilliard |
| 6,299,440 B1 | 10/2001 | Phan et al. |
| 6,309,215 B1 | 10/2001 | Phan et al. |
| 6,315,553 B1 | 11/2001 | Sachdeva et al. |
| 6,386,878 B1 | 5/2002 | Pavlovskaia et al. |
| 6,390,812 B1 | 5/2002 | Chishti et al. |
| 6,394,801 B2 | 5/2002 | Chishti et al. |
| 6,398,548 B1 | 6/2002 | Chishti et al. |
| 6,454,565 B2 | 9/2002 | Phan et al. |
| 6,463,344 B1 | 10/2002 | Pavloskaia |
| 6,471,511 B1 | 10/2002 | Chishti et al. |
| 6,485,298 B2 | 11/2002 | Chishti et al. |
| 6,488,499 B1 | 12/2002 | Miller |
| 6,524,101 B1 | 2/2003 | Phan et al. |
| 6,554,611 B2 | 4/2003 | Chishti et al. |
| 6,572,372 B1 | 6/2003 | Phan et al. |
| 6,582,227 B2 | 6/2003 | Phan et al. |
| 6,602,070 B2 | 8/2003 | Miller et al. |
| 6,607,382 B1 | 8/2003 | Kuo et al. |
| 6,626,666 B2 | 9/2003 | Chishti et al. |
| 6,629,840 B2 | 10/2003 | Chishti et al. |
| 6,682,346 B2 | 1/2004 | Chishti et al. |
| 6,688,885 B1 | 2/2004 | Sachdeva |
| 6,699,037 B2 | 3/2004 | Chishti et al. |
| 6,702,575 B2 | 3/2004 | Hilliard |
| 6,705,861 B2 | 3/2004 | Chishti et al. |
| 6,705,863 B2 | 3/2004 | Phan et al. |
| 6,722,880 B2 | 4/2004 | Chishti et al. |
| 6,729,876 B2 | 5/2004 | Chishti et al. |
| 6,761,560 B2 | 7/2004 | Miller |
| 6,783,360 B2 | 8/2004 | Chishti |
| 6,786,721 B2 | 9/2004 | Chishti et al. |
| 6,802,713 B1 | 10/2004 | Chishti et al. |
| 6,830,450 B2 | 12/2004 | Knopp et al. |
| 6,846,179 B2 | 1/2005 | Chapouland et al. |
| 6,857,429 B2 | 2/2005 | Eubank |
| 6,886,566 B2 | 5/2005 | Eubank |
| 6,964,564 B2 | 11/2005 | Phan et al. |
| 7,011,517 B2 | 3/2006 | Nicozisis |
| 7,029,275 B2 | 4/2006 | Rubbert et al. |
| 7,037,108 B2 | 5/2006 | Chishti et al. |
| 7,040,896 B2 | 5/2006 | Pavlovskaia et al. |
| 7,056,115 B2 | 6/2006 | Phan et al. |
| 7,059,850 B1 | 6/2006 | Phan et al. |
| 7,063,533 B2 | 6/2006 | Phan et al. |
| 7,074,038 B1 | 7/2006 | Miller |
| 7,077,647 B2 | 7/2006 | Choi et al. |
| 7,092,784 B1 | 8/2006 | Simkins |
| 7,104,790 B2 | 9/2006 | Cronauer |
| 7,121,825 B2 | 10/2006 | Chishti et al. |
| 7,125,248 B2 | 10/2006 | Phan et al. |
| 7,134,874 B2 | 11/2006 | Chishti et al. |
| 7,156,661 B2 | 1/2007 | Choi et al. |
| 7,160,110 B2 | 1/2007 | Imgrund et al. |
| 7,172,417 B2 | 2/2007 | Sporbert et al. |
| 7,192,275 B2 | 3/2007 | Miller |
| 7,220,122 B2 | 5/2007 | Chishti |
| 7,320,592 B2 | 1/2008 | Chishti et al. |
| 7,326,051 B2 | 2/2008 | Miller |
| 7,331,783 B2 | 2/2008 | Chishti et al. |
| 7,347,688 B2 | 3/2008 | Kopelman et al. |
| 7,416,407 B2 | 8/2008 | Cronauer |
| 7,434,582 B2 | 10/2008 | Eubank |
| 7,435,083 B2 | 10/2008 | Chishti et al. |
| 7,442,041 B2 | 10/2008 | Imgrund et al. |
| 7,458,812 B2 | 12/2008 | Sporbert et al. |
| 7,476,100 B2 | 1/2009 | Kuo |
| 7,481,121 B1 * | 1/2009 | Cao .............. A61C 7/00 73/862.044 |
| 7,553,157 B2 | 6/2009 | Abolfathi et al. |
| 7,559,328 B2 | 7/2009 | Eubank |
| 7,578,673 B2 | 8/2009 | Wen et al. |
| 7,590,462 B2 | 9/2009 | Rubbert et al. |
| 7,637,262 B2 | 12/2009 | Bailey |
| 7,641,828 B2 | 1/2010 | Desimone et al. |
| 7,658,610 B2 | 2/2010 | Knopp |
| 7,689,398 B2 | 3/2010 | Cheng et al. |
| 7,717,708 B2 | 5/2010 | Sachdeva et al. |
| 7,771,195 B2 | 8/2010 | Knopp et al. |
| 7,802,987 B1 | 9/2010 | Phan et al. |
| 7,824,180 B2 | 11/2010 | Abolfathi et al. |
| 7,826,646 B2 | 11/2010 | Pavlovskaia et al. |
| 7,840,247 B2 | 11/2010 | Liew et al. |
| 7,841,858 B2 | 11/2010 | Knopp et al. |
| 7,845,938 B2 | 12/2010 | Kim et al. |
| 7,854,609 B2 | 12/2010 | Chen et al. |
| 7,878,801 B2 | 2/2011 | Abolfathi et al. |
| 7,878,804 B2 | 2/2011 | Korytov et al. |
| 7,878,805 B2 | 2/2011 | Moss et al. |
| 7,883,334 B2 | 2/2011 | Li et al. |
| 7,901,207 B2 | 3/2011 | Knopp et al. |
| 7,905,724 B2 | 3/2011 | Kuo et al. |
| 7,914,283 B2 | 3/2011 | Kuo |
| 7,942,672 B2 | 5/2011 | Kuo |
| 7,943,079 B2 | 5/2011 | Desimone et al. |
| 7,957,824 B2 | 6/2011 | Boronvinskih et al. |
| 7,987,099 B2 | 7/2011 | Kuo et al. |
| 8,001,972 B2 | 8/2011 | Eubank |
| 8,002,543 B2 | 8/2011 | Kang et al. |
| 8,021,147 B2 | 9/2011 | Sporbert et al. |
| 8,033,282 B2 | 10/2011 | Eubank |
| 8,038,444 B2 | 10/2011 | Kitching et al. |
| 8,070,487 B2 | 12/2011 | Chishti et al. |
| 8,075,306 B2 | 12/2011 | Kitching et al. |
| 8,099,268 B2 | 1/2012 | Kitching et al. |
| 8,099,305 B2 | 1/2012 | Kuo et al. |
| 8,105,080 B2 | 1/2012 | Chishti et al. |
| 8,123,519 B2 | 2/2012 | Schultz |
| 8,152,518 B2 | 4/2012 | Kuo |
| 8,152,523 B2 | 4/2012 | Sporbert et al. |
| 8,177,551 B2 | 5/2012 | Sachdeva et al. |
| 8,235,713 B2 | 8/2012 | Phan et al. |
| 8,272,866 B2 | 9/2012 | Chun et al. |
| 8,275,180 B2 | 9/2012 | Kuo et al. |
| 8,292,617 B2 | 10/2012 | Brandt et al. |
| 8,303,302 B2 | 11/2012 | Teasdale |
| 8,348,665 B2 | 1/2013 | Kuo |
| 8,356,993 B1 | 1/2013 | Marston |
| 8,401,686 B2 | 3/2013 | Moss et al. |
| 8,401,826 B2 | 3/2013 | Cheng et al. |
| 8,439,672 B2 | 5/2013 | Matov et al. |
| 8,439,673 B2 | 5/2013 | Korytov et al. |
| 8,444,412 B2 | 5/2013 | Baughman et al. |
| 8,465,280 B2 | 6/2013 | Sachdeva et al. |
| 8,469,705 B2 | 6/2013 | Sachdeva et al. |
| 8,469,706 B2 | 6/2013 | Kuo |
| 8,496,474 B2 | 7/2013 | Chishti et al. |
| 8,512,037 B2 | 8/2013 | Andreiko |
| 8,517,726 B2 | 8/2013 | Kakavand et al. |

(56) References Cited

U.S. PATENT DOCUMENTS

| | | |
|---|---|---|
| 8,535,580 B2 | 9/2013 | Puttler et al. |
| 8,562,337 B2 | 10/2013 | Kuo et al. |
| 8,562,338 B2 | 10/2013 | Kitching et al. |
| 8,562,340 B2 | 10/2013 | Chishti et al. |
| 8,636,509 B2 | 1/2014 | Miller |
| 8,636,510 B2 | 1/2014 | Kitching et al. |
| 8,690,568 B2 | 4/2014 | Chapoulaud et al. |
| 8,708,697 B2 | 4/2014 | Li et al. |
| 8,734,149 B2 | 5/2014 | Phan et al. |
| 8,734,150 B2 | 5/2014 | Chishti et al. |
| 8,738,165 B2 | 5/2014 | Cinader, Jr. et al. |
| 8,765,031 B2 | 7/2014 | Li et al. |
| 8,777,611 B2 | 7/2014 | Cios |
| 8,780,106 B2 | 7/2014 | Chishti et al. |
| 8,807,999 B2 | 8/2014 | Kuo et al. |
| 8,858,226 B2 | 10/2014 | Phan et al. |
| 8,864,493 B2 | 10/2014 | Leslie-Martin et al. |
| 8,899,976 B2 | 12/2014 | Chen et al. |
| 8,899,978 B2 | 12/2014 | Kitching et al. |
| 8,930,219 B2 | 1/2015 | Trosien et al. |
| 8,936,464 B2 | 1/2015 | Kopelman |
| 8,998,608 B2 | 1/2015 | Trosien et al. |
| 8,944,812 B2 | 2/2015 | Kuo et al. |
| 8,961,173 B2 | 2/2015 | Miller |
| 8,986,003 B2 | 3/2015 | Valoir |
| 8,992,215 B2 | 3/2015 | Chapoulaud et al. |
| 9,004,915 B2 | 4/2015 | Moss et al. |
| 9,022,781 B2 | 5/2015 | Kuo et al. |
| 9,026,238 B2 | 5/2015 | Kraemer et al. |
| 9,060,829 B2 | 6/2015 | Sterental et al. |
| 9,107,722 B2 | 8/2015 | Matov et al. |
| 9,119,691 B2 | 9/2015 | Namiranian et al. |
| 9,119,696 B2 | 9/2015 | Giordano et al. |
| 9,161,823 B2 | 10/2015 | Morton et al. |
| 9,161,824 B2 | 10/2015 | Chishti et al. |
| 9,204,942 B2 | 12/2015 | Phan et al. |
| 9,211,166 B2 | 12/2015 | Kuo et al. |
| 9,241,774 B2 | 1/2016 | Li et al. |
| 9,301,814 B2 | 4/2016 | Kaza et al. |
| 9,320,575 B2 | 4/2016 | Chishti et al. |
| 9,326,830 B2 | 5/2016 | Kitching et al. |
| 9,326,831 B2 | 5/2016 | Cheang |
| 9,333,052 B2 | 5/2016 | Miller |
| 9,345,557 B2 | 5/2016 | Anderson et al. |
| 9,351,809 B2 | 5/2016 | Phan et al. |
| 9,364,297 B2 | 6/2016 | Kitching et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,492,245 B2 | 11/2016 | Sherwood et al. |
| 9,820,829 B2 | 11/2017 | Kuo |
| 9,844,420 B2 | 12/2017 | Cheang |
| 9,917,868 B2 | 3/2018 | Ahmed |
| 9,922,170 B2 | 3/2018 | Trosien et al. |
| 10,011,050 B2 | 7/2018 | Kitching et al. |
| 10,022,204 B2 | 7/2018 | Cheang |
| 10,335,250 B2 | 7/2019 | Wen |
| 10,357,336 B2 | 7/2019 | Wen |
| 10,357,342 B2 | 7/2019 | Wen |
| 10,548,690 B2 | 2/2020 | Wen |
| 10,588,723 B2 | 3/2020 | Falkel |
| 10,624,717 B2 | 4/2020 | Wen |
| 10,631,953 B2 | 4/2020 | Wen |
| 10,881,486 B2 | 1/2021 | Wen |
| 10,925,698 B2 | 2/2021 | Falkel |
| 10,952,821 B2 | 3/2021 | Falkel |
| 11,051,913 B2 | 7/2021 | Wen |
| 11,096,763 B2 | 8/2021 | Akopov et al. |
| 11,207,161 B2 | 12/2021 | Brant |
| 11,348,257 B2 | 5/2022 | Lang |
| 11,364,098 B2 | 6/2022 | Falkel |
| 11,553,989 B2 | 1/2023 | Wen et al. |
| 11,583,365 B2 | 2/2023 | Wen |
| 11,638,628 B2 | 5/2023 | Wen |
| 11,663,383 B2 * | 5/2023 | Cao ................. G06F 30/327 716/106 |
| 11,707,180 B2 | 7/2023 | Falkel |
| 11,771,524 B2 | 10/2023 | Wen |
| 2001/0002310 A1 | 5/2001 | Chishti et al. |
| 2002/0009686 A1 | 1/2002 | Loc et al. |
| 2002/0010568 A1 | 1/2002 | Rubbert et al. |
| 2002/0025503 A1 | 2/2002 | Chapoulaud et al. |
| 2002/0042038 A1 | 4/2002 | Miller et al. |
| 2002/0051951 A1 | 5/2002 | Chishti et al. |
| 2002/0072027 A1 | 6/2002 | Chisti |
| 2002/0094503 A1 | 7/2002 | Chishti et al. |
| 2002/0110776 A1 | 8/2002 | Abels et al. |
| 2002/0150859 A1 | 11/2002 | Imgrund et al. |
| 2002/0177108 A1 | 11/2002 | Pavlovskaia et al. |
| 2003/0003416 A1 | 1/2003 | Chishti et al. |
| 2003/0008259 A1 | 1/2003 | Kuo et al. |
| 2003/0039940 A1 | 2/2003 | Miller |
| 2003/0190576 A1 | 10/2003 | Phan et al. |
| 2003/0207224 A1 | 11/2003 | Lotte |
| 2004/0023188 A1 | 2/2004 | Pavlovskaia et al. |
| 2004/0029068 A1 | 2/2004 | Sachdeva et al. |
| 2004/0038168 A1 | 2/2004 | Choi et al. |
| 2004/0134599 A1 | 7/2004 | Wang et al. |
| 2004/0142299 A1 | 7/2004 | Miller |
| 2004/0152036 A1 | 8/2004 | Abolfathi |
| 2004/0166456 A1 | 8/2004 | Chishti et al. |
| 2004/0166462 A1 | 8/2004 | Phan et al. |
| 2004/0166463 A1 | 8/2004 | Wen et al. |
| 2004/0197728 A1 | 10/2004 | Abolfathi et al. |
| 2004/0202983 A1 | 10/2004 | Tricca et al. |
| 2004/0219471 A1 | 11/2004 | Cleary et al. |
| 2004/0229183 A1 | 11/2004 | Knopp et al. |
| 2004/0242987 A1 | 12/2004 | Liew et al. |
| 2004/0253562 A1 | 12/2004 | Knopp |
| 2005/0010450 A1 | 1/2005 | Hultgren et al. |
| 2005/0019721 A1 | 1/2005 | Chishti |
| 2005/0048432 A1 | 3/2005 | Choi et al. |
| 2005/0095552 A1 | 5/2005 | Sporbert et al. |
| 2005/0095562 A1 | 5/2005 | Sporbert et al. |
| 2005/0118555 A1 | 6/2005 | Sporbert et al. |
| 2005/0153255 A1 | 7/2005 | Sporbert et al. |
| 2005/0192835 A1 | 9/2005 | Kuo et al. |
| 2005/0238967 A1 | 10/2005 | Rogers et al. |
| 2005/0241646 A1 | 11/2005 | Sotos et al. |
| 2005/0244781 A1 | 11/2005 | Abels et al. |
| 2005/0244782 A1 | 11/2005 | Chishti et al. |
| 2005/0271996 A1 | 12/2005 | Sporbert et al. |
| 2006/0003283 A1 | 1/2006 | Miller et al. |
| 2006/0035197 A1 | 2/2006 | Hishimoto |
| 2006/0068353 A1 | 3/2006 | Abolfathi et al. |
| 2006/0078840 A1 | 4/2006 | Robson |
| 2006/0078841 A1 | 4/2006 | Desimone et al. |
| 2006/0084030 A1 | 4/2006 | Phan et al. |
| 2006/0093982 A1 | 5/2006 | Wen |
| 2006/0099546 A1 | 5/2006 | Bergersen |
| 2006/0115785 A1 | 6/2006 | Li et al. |
| 2006/0147872 A1 | 7/2006 | Andreiko |
| 2006/0177789 A1 | 8/2006 | O'Bryan |
| 2006/0188834 A1 | 8/2006 | Hilliard |
| 2006/0199142 A1 | 9/2006 | Liu et al. |
| 2006/0223022 A1 | 10/2006 | Solomon |
| 2006/0223023 A1 | 10/2006 | Lai et al. |
| 2006/0275731 A1 | 12/2006 | Wen et al. |
| 2006/0275736 A1 | 12/2006 | Wen et al. |
| 2007/0003907 A1 | 1/2007 | Chishti et al. |
| 2007/0238065 A1 | 10/2007 | Sherwood et al. |
| 2007/0264606 A1 | 11/2007 | Muha et al. |
| 2007/0283967 A1 | 12/2007 | Bailey |
| 2008/0032248 A1 | 2/2008 | Kuo |
| 2008/0044786 A1 | 2/2008 | Kalili |
| 2008/0050692 A1 | 2/2008 | Hilliard |
| 2008/0051650 A1 | 2/2008 | Massie et al. |
| 2008/0057461 A1 | 3/2008 | Cheng et al. |
| 2008/0057462 A1 | 3/2008 | Kitching et al. |
| 2008/0076086 A1 | 3/2008 | Kitching et al. |
| 2008/0085487 A1 | 4/2008 | Kuo et al. |
| 2008/0115791 A1 | 5/2008 | Heine |
| 2008/0118882 A1 | 5/2008 | Su |

(56) References Cited

U.S. PATENT DOCUMENTS

| | | |
|---|---|---|
| 2008/0141534 A1 | 6/2008 | Hilliard |
| 2008/0182220 A1 | 7/2008 | Chishti et al. |
| 2008/0206702 A1 | 8/2008 | Hedge et al. |
| 2008/0215176 A1 | 9/2008 | Borovinskih et al. |
| 2008/0233528 A1 | 9/2008 | Kim et al. |
| 2008/0233530 A1 | 9/2008 | Cinader |
| 2008/0248438 A1 | 10/2008 | Desimone et al. |
| 2008/0248443 A1 | 10/2008 | Chisti et al. |
| 2008/0261165 A1 | 10/2008 | Steingart et al. |
| 2008/0268400 A1 | 10/2008 | Moss et al. |
| 2008/0280247 A1 | 11/2008 | Sachdeva et al. |
| 2008/0305451 A1 | 12/2008 | Kitching et al. |
| 2008/0305453 A1 | 12/2008 | Kitching et al. |
| 2009/0081604 A1 | 3/2009 | Fisher |
| 2009/0117510 A1 | 5/2009 | Minium |
| 2009/0191502 A1 | 7/2009 | Cao et al. |
| 2009/0269714 A1 | 10/2009 | Knopp |
| 2009/0280450 A1 | 11/2009 | Kuo |
| 2009/0291407 A1 | 11/2009 | Kuo |
| 2009/0291408 A1 | 11/2009 | Stone-Collonge et al. |
| 2010/0036682 A1 | 2/2010 | Trosien et al. |
| 2010/0055635 A1 | 3/2010 | Kakavand |
| 2010/0086890 A1 | 4/2010 | Kuo |
| 2010/0138025 A1 | 6/2010 | Morton et al. |
| 2010/0167225 A1 | 7/2010 | Kuo |
| 2010/0173266 A1 | 7/2010 | Lu et al. |
| 2010/0179789 A1 | 7/2010 | Sachdeva et al. |
| 2010/0239992 A1 | 9/2010 | Brandt et al. |
| 2010/0280798 A1 | 11/2010 | Pattijn et al. |
| 2011/0005527 A1 | 1/2011 | Andrew et al. |
| 2011/0015591 A1 | 1/2011 | Hanson et al. |
| 2011/0020761 A1 | 1/2011 | Kalil |
| 2011/0039223 A1 | 2/2011 | Li |
| 2011/0091832 A1 | 4/2011 | Kim et al. |
| 2011/0114100 A1 | 5/2011 | Alvarez et al. |
| 2011/0123944 A1 | 5/2011 | Knopp et al. |
| 2011/0129786 A1 | 6/2011 | Chun et al. |
| 2011/0159451 A1 | 6/2011 | Kuo et al. |
| 2011/0165533 A1 | 7/2011 | Li et al. |
| 2011/0269092 A1 | 11/2011 | Kuo et al. |
| 2011/0269097 A1 | 11/2011 | Sporbert et al. |
| 2011/0270588 A1 | 11/2011 | Kuo et al. |
| 2011/0281229 A1 | 11/2011 | Abolfathi |
| 2012/0035901 A1 | 2/2012 | Kitching et al. |
| 2012/0123577 A1 | 5/2012 | Chapoulaud et al. |
| 2012/0150494 A1 | 6/2012 | Anderson et al. |
| 2012/0186589 A1 | 7/2012 | Singh |
| 2012/0199136 A1 | 8/2012 | Urbano |
| 2012/0214121 A1 | 8/2012 | Greenberg |
| 2012/0225399 A1 | 9/2012 | Teasdale |
| 2012/0225400 A1 | 9/2012 | Chishti et al. |
| 2012/0225401 A1 | 9/2012 | Kitching et al. |
| 2012/0227750 A1 | 9/2012 | Tucker |
| 2012/0244488 A1 | 9/2012 | Chishti et al. |
| 2012/0270173 A1 | 10/2012 | Pumphrey et al. |
| 2012/0288818 A1 | 11/2012 | Vendittelli |
| 2013/0004634 A1 | 1/2013 | McCaskey et al. |
| 2013/0022255 A1 | 1/2013 | Chen et al. |
| 2013/0052625 A1 | 2/2013 | Wagner |
| 2013/0078593 A1 | 3/2013 | Andreiko |
| 2013/0081271 A1 | 4/2013 | Farzin-Nia et al. |
| 2013/0085018 A1 | 4/2013 | Jensen et al. |
| 2013/0095446 A1 | 4/2013 | Andreiko et al. |
| 2013/0122445 A1 | 5/2013 | Marston |
| 2013/0122448 A1 | 5/2013 | Kitching |
| 2013/0157213 A1 | 6/2013 | Arruda |
| 2013/0201450 A1 | 8/2013 | Bailey et al. |
| 2013/0204583 A1 | 8/2013 | Matov et al. |
| 2013/0230819 A1 | 9/2013 | Arruda |
| 2013/0231899 A1 | 9/2013 | Khardekar et al. |
| 2013/0236848 A1 | 9/2013 | Arruda |
| 2013/0266906 A1 | 10/2013 | Soo |
| 2013/0302742 A1 | 11/2013 | Li et al. |
| 2013/0308846 A1 | 11/2013 | Chen et al. |
| 2013/0317800 A1 | 11/2013 | Wu et al. |
| 2013/0323665 A1 | 12/2013 | Dinh et al. |
| 2013/0325431 A1 | 12/2013 | See et al. |
| 2014/0023980 A1 | 1/2014 | Kitching et al. |
| 2014/0072926 A1 | 3/2014 | Valoir |
| 2014/0073212 A1 | 3/2014 | Lee |
| 2014/0076332 A1 | 3/2014 | Luco |
| 2014/0122027 A1 | 5/2014 | Andreiko et al. |
| 2014/0124968 A1 | 5/2014 | Kim |
| 2014/0167300 A1 | 6/2014 | Lee |
| 2014/0172375 A1 | 6/2014 | Grove |
| 2014/0178830 A1 | 6/2014 | Widu |
| 2014/0193765 A1 | 7/2014 | Kitching et al. |
| 2014/0193767 A1 | 7/2014 | Li et al. |
| 2014/0229878 A1 | 8/2014 | Wen et al. |
| 2014/0242532 A1 | 8/2014 | Arruda |
| 2014/0255864 A1 | 9/2014 | Machata et al. |
| 2014/0272757 A1 | 9/2014 | Chishti |
| 2014/0287376 A1 | 9/2014 | Hultgren et al. |
| 2014/0288894 A1 | 9/2014 | Chishti et al. |
| 2014/0315153 A1 | 10/2014 | Kitching |
| 2014/0315154 A1 | 10/2014 | Jung et al. |
| 2014/0067335 A1 | 11/2014 | Andreiko et al. |
| 2014/0329194 A1 | 11/2014 | Sachdeva et al. |
| 2014/0349242 A1 | 11/2014 | Phan et al. |
| 2014/0358497 A1 | 12/2014 | Kuo et al. |
| 2014/0363779 A1 | 12/2014 | Kopelman |
| 2014/0370452 A1 | 12/2014 | Tseng |
| 2015/0004553 A1 | 1/2015 | Li et al. |
| 2015/0004554 A1 | 1/2015 | Cao et al. |
| 2015/0018956 A1 | 1/2015 | Steinmann et al. |
| 2015/0025907 A1 | 1/2015 | Trosien et al. |
| 2015/0044623 A1 | 2/2015 | Rundlett |
| 2015/0044627 A1 | 2/2015 | German |
| 2015/0057983 A1 | 2/2015 | See et al. |
| 2015/0064641 A1 | 3/2015 | Gardner |
| 2015/0093713 A1 | 4/2015 | Chen et al. |
| 2015/0093714 A1 | 4/2015 | Kopelman |
| 2015/0125802 A1 | 5/2015 | Tal |
| 2015/0128421 A1 | 5/2015 | Mason et al. |
| 2015/0157421 A1 | 6/2015 | Martz et al. |
| 2015/0182303 A1 | 7/2015 | Abraham et al. |
| 2015/0182321 A1 | 7/2015 | Karazivan et al. |
| 2015/0216626 A1 | 8/2015 | Ranjbar |
| 2015/0216627 A1 | 8/2015 | Kopelman |
| 2015/0238280 A1 | 8/2015 | Wu et al. |
| 2015/0238282 A1 | 8/2015 | Kuo et al. |
| 2015/0238283 A1 | 8/2015 | Tanugula et al. |
| 2015/0238284 A1 | 8/2015 | Wu et al. |
| 2015/0245887 A1 | 9/2015 | Izugami et al. |
| 2015/0254410 A1 | 9/2015 | Sterental et al. |
| 2015/0265376 A1 | 9/2015 | Kopelman |
| 2015/0289949 A1 | 10/2015 | Moss et al. |
| 2015/0289950 A1 | 10/2015 | Khan |
| 2015/0305830 A1 | 10/2015 | Howard et al. |
| 2015/0305831 A1 | 10/2015 | Cosse |
| 2015/0305919 A1 | 10/2015 | Stubbs et al. |
| 2015/0313687 A1 | 11/2015 | Blees et al. |
| 2015/0320518 A1 | 11/2015 | Namiranian et al. |
| 2015/0320532 A1 | 11/2015 | Matty et al. |
| 2015/0335399 A1 | 11/2015 | Caraballo |
| 2015/0335404 A1 | 11/2015 | Webber et al. |
| 2015/0336299 A1 | 11/2015 | Tanugula et al. |
| 2015/0342464 A1 | 12/2015 | Wundrak et al. |
| 2015/0351870 A1 | 12/2015 | Mah |
| 2015/0351871 A1 | 12/2015 | Chishti et al. |
| 2015/0359609 A1 | 12/2015 | Khan |
| 2015/0366637 A1 | 12/2015 | Kopelman et al. |
| 2015/0366638 A1 | 12/2015 | Kopelman et al. |
| 2016/0000527 A1 | 1/2016 | Arruda |
| 2016/0008095 A1 | 1/2016 | Matov et al. |
| 2016/0008097 A1 | 1/2016 | Chen et al. |
| 2016/0051341 A1 | 2/2016 | Webber |
| 2016/0051342 A1 | 2/2016 | Phan et al. |
| 2016/0051348 A1 | 2/2016 | Boerjes et al. |
| 2016/0067013 A1 | 3/2016 | Morton et al. |
| 2016/0067014 A1 | 3/2016 | Kottemann et al. |
| 2016/0074137 A1 | 3/2016 | Kuo et al. |
| 2016/0074138 A1 | 3/2016 | Kitching et al. |
| 2016/0095668 A1 | 4/2016 | Kuo et al. |

(56) References Cited

U.S. PATENT DOCUMENTS

| | | |
|---|---|---|
| 2016/0095670 A1 | 4/2016 | Witte et al. |
| 2016/0106521 A1 | 4/2016 | Tanugulaet |
| 2016/0120617 A1 | 5/2016 | Lee |
| 2016/0120621 A1 | 5/2016 | Li et al. |
| 2016/0128803 A1 | 5/2016 | Webber et al. |
| 2016/0135924 A1 | 5/2016 | Choi et al. |
| 2016/0135925 A1 | 5/2016 | Mason et al. |
| 2016/0135926 A1 | 5/2016 | Djamchidi |
| 2016/0135927 A1 | 5/2016 | Boltunov et al. |
| 2016/0157961 A1 | 6/2016 | Lee |
| 2016/0166363 A1 | 6/2016 | Varsano |
| 2016/0175068 A1 | 6/2016 | Cai et al. |
| 2016/0175069 A1 | 6/2016 | Korytov et al. |
| 2016/0184129 A1 | 6/2016 | Liptak et al. |
| 2016/0193014 A1 | 7/2016 | Morton et al. |
| 2016/0199216 A1 | 7/2016 | Cam et al. |
| 2016/0203604 A1 | 7/2016 | Gupta et al. |
| 2016/0206402 A1 | 7/2016 | Kitching et al. |
| 2016/0220200 A1 | 8/2016 | Sanholm et al. |
| 2016/0228213 A1 | 8/2016 | Tod et al. |
| 2016/0256240 A1 | 9/2016 | Shivapuja et al. |
| 2016/0310235 A1 | 10/2016 | Derakhshan et al. |
| 2016/0338799 A1 | 11/2016 | Wu et al. |
| 2016/0367339 A1 | 12/2016 | Khardekar et al. |
| 2017/0007359 A1 | 1/2017 | Kopelman et al. |
| 2017/0079748 A1 | 3/2017 | Andreiko |
| 2017/0100207 A1 | 4/2017 | Wen |
| 2017/0100208 A1 | 4/2017 | Wen |
| 2017/0100209 A1 | 4/2017 | Wen |
| 2017/0100210 A1 | 4/2017 | Wen |
| 2017/0100211 A1 | 4/2017 | Wen |
| 2017/0100214 A1 | 4/2017 | Wen |
| 2017/0231721 A1 | 8/2017 | Akeel et al. |
| 2017/0325911 A1 | 11/2017 | Marshall |
| 2018/0014912 A1 | 1/2018 | Radmand |
| 2018/0028065 A1 | 2/2018 | Elbaz et al. |
| 2018/0042708 A1 | 2/2018 | Caron et al. |
| 2018/0055611 A1 | 3/2018 | Sun et al. |
| 2018/0078335 A1 | 3/2018 | Falkel |
| 2018/0078343 A1 | 3/2018 | Falkel |
| 2018/0078344 A1 | 3/2018 | Falkel |
| 2018/0078347 A1 | 3/2018 | Falkel |
| 2018/0092714 A1 | 4/2018 | Kitching et al. |
| 2018/0092715 A1 | 4/2018 | Kitching et al. |
| 2018/0125610 A1 | 5/2018 | Carrier, Jr. et al. |
| 2018/0158544 A1 | 6/2018 | Trosien et al. |
| 2018/0161126 A1 | 6/2018 | Marshall et al. |
| 2018/0168781 A1 | 6/2018 | Kopelman et al. |
| 2018/0333226 A1* | 11/2018 | Tsai .................... B29C 51/46 |
| 2018/0344431 A1 | 12/2018 | Kuo et al. |
| 2019/0008612 A1 | 1/2019 | Kitching et al. |
| 2019/0046297 A1 | 2/2019 | Kopelman et al. |
| 2019/0090987 A1 | 3/2019 | Hung |
| 2019/0231478 A1 | 8/2019 | Kopelman |
| 2019/0321135 A1 | 10/2019 | Wen |
| 2019/0343602 A1 | 11/2019 | Wen |
| 2019/0350680 A1 | 11/2019 | Chekh et al. |
| 2019/0358002 A1 | 11/2019 | Falke |
| 2019/0388189 A1 | 12/2019 | Shivapuja et al. |
| 2020/0000552 A1 | 1/2020 | Mednikov et al. |
| 2020/0047868 A1 | 2/2020 | Young et al. |
| 2020/0081413 A1 | 3/2020 | Georg et al. |
| 2020/0105028 A1 | 4/2020 | Gao et al. |
| 2020/0146775 A1 | 5/2020 | Wen |
| 2020/0170762 A1 | 6/2020 | Falkel |
| 2020/0205936 A1 | 7/2020 | Wen |
| 2020/0214801 A1 | 7/2020 | Wang et al. |
| 2020/0253693 A1 | 8/2020 | Wen |
| 2020/0316856 A1 | 10/2020 | Mojdeh et al. |
| 2020/0345459 A1 | 11/2020 | Schueller et al. |
| 2020/0357186 A1 | 11/2020 | Pokotilov et al. |
| 2020/0360120 A1 | 11/2020 | Inoue et al. |
| 2021/0106404 A1 | 4/2021 | Wen |
| 2021/0153981 A1 | 5/2021 | Falkel |
| 2021/0186668 A1 | 6/2021 | Falkel |
| 2021/0244518 A1 | 8/2021 | Ryu et al. |
| 2021/0282899 A1 | 9/2021 | Wen |
| 2021/0369417 A1 | 12/2021 | Wen et al. |
| 2021/0393376 A1 | 12/2021 | Wu et al. |
| 2022/0054232 A1 | 2/2022 | Wen et al. |
| 2022/0265395 A1 | 8/2022 | Falkel |
| 2022/0266577 A1 | 8/2022 | Sharma et al. |
| 2022/0409338 A1* | 12/2022 | Cao .................... A61C 7/002 |
| 2023/0053766 A1 | 2/2023 | Cao et al. |
| 2023/0058890 A1 | 2/2023 | Kenworthy |
| 2023/0233288 A1 | 7/2023 | Wen |
| 2023/0240808 A1 | 8/2023 | Schueller et al. |
| 2023/0320565 A1 | 10/2023 | Falkel |

FOREIGN PATENT DOCUMENTS

| | | |
|---|---|---|
| CN | 1997324 | 7/2007 |
| CN | 101427256 | 5/2009 |
| CN | 101636122 | 1/2010 |
| CN | 1973291 | 9/2010 |
| CN | 102438545 | 5/2012 |
| CN | 101528152 | 12/2012 |
| CN | 103932807 | 7/2014 |
| CN | 105748163 | 7/2016 |
| CN | 106580509 A * | 4/2017 |
| EP | 1474062 | 4/2011 |
| EP | 2056734 | 9/2015 |
| EP | 2957252 | 12/2015 |
| HK | 40004866 B | 8/2022 |
| JP | 2005-515826 | 6/2005 |
| JP | 2006-500999 | 1/2006 |
| JP | 2008-532563 | 8/2008 |
| JP | 2009-202031 | 9/2009 |
| JP | 4323322 | 9/2009 |
| JP | 2010-502246 | 1/2010 |
| JP | 2010-528748 | 8/2010 |
| JP | 4566746 | 10/2010 |
| JP | 2012-139540 | 7/2012 |
| JP | 5015197 | 8/2012 |
| JP | 5015765 | 8/2012 |
| JP | 5149898 | 2/2013 |
| JP | 2013-081785 | 5/2013 |
| JP | 5291218 | 9/2013 |
| JP | 2007-525289 | 9/2017 |
| JP | 2019013463 A * | 1/2019 |
| JP | 2019-529042 | 10/2019 |
| JP | 2019-537033 | 12/2019 |
| KR | 2004-46323 | 10/2009 |
| KR | 10-1450866 | 10/2014 |
| KR | 2018-0090481 | 8/2018 |
| WO | WO 2001/082192 | 11/2001 |
| WO | WO 2002/047571 | 6/2002 |
| WO | WO 2003/063721 | 8/2003 |
| WO | WO 2004/028391 | 4/2004 |
| WO | WO 2005/086058 | 9/2005 |
| WO | WO 2004/098379 | 11/2005 |
| WO | WO 2006/050452 | 5/2006 |
| WO | WO 2006/096558 | 9/2006 |
| WO | WO 2008/026064 | 3/2008 |
| WO | WO 2008/102132 | 8/2008 |
| WO | WO 2008/118546 | 10/2008 |
| WO | WO 2008/149222 | 12/2008 |
| WO | WO 2009/057937 | 5/2009 |
| WO | WO 2009/068892 | 6/2009 |
| WO | WO 2016/004415 | 1/2016 |
| WO | WO 2016/100577 | 6/2016 |
| WO | WO 2017/062207 | 4/2017 |
| WO | WO 2017/062208 | 4/2017 |
| WO | WO 2017/062209 | 4/2017 |
| WO | WO 2017/062210 | 4/2017 |
| WO | WO 2018/057622 | 3/2018 |
| WO | WO 2018/112273 | 6/2018 |
| WO | WO 2018/118200 | 6/2018 |
| WO | WO 2020/222905 | 11/2020 |
| WO | WO 2020/223384 | 11/2020 |
| WO | WO 2021/105878 | 6/2021 |
| WO | WO 2021/247145 | 12/2021 |
| WO | WO-2021247950 A1 * | 12/2021 |
| WO | WO 2022/040671 | 2/2022 |

(56) References Cited

FOREIGN PATENT DOCUMENTS

| WO | WO 2022/178514 | 8/2022 |
|----|----------------|--------|
| WO | WO 2023/023417 | 2/2023 |
| WO | WO 2023/023418 | 2/2023 |

\* cited by examiner

SYSTEM FOR FORCE MEASUREMENT UPON ORTHODONTIC APPLIANCES

CROSS-REFERENCE TO RELATED APPLICATIONS

This application claims priority to U.S. Patent Application No. 63/214,187 filed Jun. 23, 2021, the content of which is incorporated herein by reference in its entirety.

FIELD OF THE INVENTION

The present invention relates to methods and apparatus for orthodontics. More particularly, the present invention relates to methods and apparatus for measuring the shape and movement of orthodontic appliances to determine conformance with design intent.

BACKGROUND OF THE INVENTION

Orthodontics is a specialty of dentistry that is concerned with the study and treatment of malocclusions which can result from tooth irregularities, disproportionate facial skeleton relationships, or both. Orthodontics treats malocclusion through the displacement of teeth via bony remodeling and control and modification of facial growth.

This process has been traditionally accomplished by using static mechanical force to induce bone remodeling, thereby enabling teeth to move. In this approach, braces having an archwire interface with brackets are affixed to each tooth. As the teeth respond to the pressure applied via the archwire by shifting their positions, the wires are again tightened to apply additional pressure. This widely accepted approach to treating malocclusions takes about twenty-four months on average to complete, and is used to treat a number of different classifications of clinical malocclusion. Treatment with braces is complicated by the fact that it is uncomfortable and/or painful for patients, and the orthodontic appliances are perceived as unaesthetic, all of which creates considerable resistance to use. Further, the treatment time cannot be shortened by increasing the force, because too high a force results in root resorption, as well as being more painful. The average treatment time of twenty-four months is very long, and further reduces usage. In fact, some estimates provide that less than half of the patients who could benefit from such treatment elect to pursue orthodontics.

The use of plastic shell aligners is often utilized to perform orthodontic movements on the teeth while maintaining the aesthetics of the dentition. However, the plastic shell of the aligner may sometimes stretch so much that the shell applies an uncomfortable amount of force, which could be painful, to a patient. Alternatively, the plastic shell of the aligner may weaken or degrade over time such that the force applied by the aligner does not conform with the actual delivery of the force such that the movement of the teeth is inadequate.

However, due to the complex design and shape of the orthodontic aligners, measuring the expected forces applied upon the teeth by the aligners is difficult. This is further complicated by different formulations of polymers which can result in varying strength levels of the orthodontic aligners.

Accordingly, there exists a need for an effective way of measuring the actual forces imparted by the orthodontic aligners to determine whether the actual forces conform to the expected forces.

SUMMARY OF THE INVENTION

Orthodontic aligners are designed to impart a particular force or moment upon a specified portion of the dentition in order to effect a desired movement of one or more teeth as part of the treatment for correcting malocclusions. However, the aligner which is physically fabricated may impart forces upon the teeth which are not consistent with the level of force intended by design. While the discrepancy may be due to a number of different factors such as material selection, manufacturing errors, etc., the differences between the intended design and the fabricated design are difficult to measure due in part to the complex design of the orthodontic aligner.

Hence, a force measurement instrument may be used to measure a force and moment load imparted by an orthodontic appliance such as an aligner, brackets, arch wires, or other orthodontic devices upon the dentition in up to six dimensions in space such that the resulting reaction force and moment load of six dimensional output data from the orthodontic appliance may be measured. For example, the force and moment along or around three dimensional axes (X, Y, and Z axes) may be measured, e.g., Fx, Fy, Fz, Mx, My, Mz. This data may be obtained and used to determine whether the shape and movement of a removable or fixed orthodontic appliance such as an aligner conforms to the design intent of the treatment. The measurement of the force and moment can also be transformed to the tooth crown center and resistance center based coordinate systems, as further described herein.

The force measurement instrument may include a housing which supports a platform upon which the orthodontic aligner and arch model may be positioned and supported. A measurement sensor having a target tooth mounting plate positioned upon the measurement sensor may be located adjacent to the platform for providing a secondary platform upon which a force inducing feature may be secured.

In measuring the reaction forces of an orthodontic apparatus such as an aligner, a positive mold of the patient dentition may be fabricated based upon the scanned 3D model where one or more teeth of interest of the dentition may be designated as a target tooth (or teeth) where the resulting forces and moments of the corresponding aligner are to be measured. If the strength of the aligner which is designed to be positioned upon the patient's dentition for treatment is to be determined through measurement, at least one selected target tooth of the dentition mold in the region of the aligner to be measured may be designated as the target tooth and fabricated as a separate fixture from the rest of the dentition mold. The dentition mold may be representative of a patient's upper teeth or lower teeth and while the entire row may be fabricated, portions of the dentition representing a few number of teeth may instead be used depending upon the desired region for measurement.

The target tooth and fixture may form the complete dentition mold but may be movable independently of the dentition mold. The fixture may be slidably positioned along a slot defined within the mold to allow for the movement of the fixture separately from the mold. The dentition platform and dentition mold may be secured to the platform using, e.g., one or more fasteners, such that the dentition platform is stationary when attached to the platform. The fixture may be attached to the target tooth mounting plate upon the measurement sensor separately from the dentition platform such that the target tooth is aligned within the slot defined along the dentition mold. As the target tooth and fixture are intended to be moved relative to the dentition mold, a slight gap may remain between the target tooth and the adjacent teeth along the dentition mold so that the target tooth and fixture may move unhindered in all dimensions in order to measure the forces from the aligner.

The mold may be formed upon the dentition platform such that the target tooth and fixture may be attached to the target tooth mounting plate. Once the target tooth is adequately aligned with the rest of the teeth upon the mold, an orthodontic appliance such as an aligner may be placed upon the mold and target tooth to mimic a patient placing their aligner upon their teeth for treatment, as illustrated. With the aligner sufficiently placed upon the mold, the aligner may exert upon the target tooth forces and moments which are transmitted through the fixture, to the target tooth mounting plate, and ultimately to the measurement sensor which may then be used to measure the forces and moments imparted upon the target tooth by the aligner. Because of the gap formed between the target tooth and adjacent teeth on the mold, the target tooth may move and/or rotate unhindered to ensure a complete force and moment measurement. These measured forces and moments may be compared to the expected forces and moments generated by the digital model of the aligner to see how the actual values compare to the designed and expected values. If the actual values and the expected values are within an acceptable range, this may be an indication that the actual aligner is performing as expected. However, if the actual values and the expected values are outside of an acceptable range, this may be an indication that the fabricated aligner is not performing as expected where the discrepancy may be due to an error in the digital model, the fabrication process of the aligner, the materials used for aligner fabrication, or any number of other factors which may need to be addressed until the discrepancy is resolved.

The forces and moments applied to the target tooth may be transmitted via the fixture against the mounting plate for measurement by the sensor. The measurement sensor may be configured to detect various level of forces and moments.

Using a treatment planning software platform such as the uDesign treatment planning software (uLab Systems, Inc., San Mateo, CA) for treating orthodontic malocclusions, the digital 3D model of the patient's dentition obtained from scanned images may be exported from the software platform. Other commercially available treatment planning software systems may be used in the alternative as well. The target tooth may be identified in the software and the target tooth, dentition platform, and dentition mold may be fabricated from the digital model using, e.g., 3D printing, CNC machining, etc. and then assembled on the platform of the measurement instrument. Because of the presence of the gaps between the target tooth and adjacent teeth on the mold once the target tooth is positioned within the slot, a filler such as putty may be used to fill the gaps, if needed. The entire assembly of the target tooth and fixture secured on the mounting plate as well as the dentition platform and dentition mold secured upon the platform may then be scanned, for example, using an intra-oral scanner or other scanner to create a corresponding 3D digital model. The filler material may be removed from the gaps between the target tooth and mold.

The scanned digital model of the assembly may be opened in the software platform where the digital model of the target tooth may be digitally manipulated according to the real position of the target tooth and mold. The aligner to be placed upon the target tooth and mold may then be fabricated and any forces or moments imparted on the target tooth when aligned within the slot of the mold (without the aligner) may be measured initially and zeroed out to calibrate the sensor. The aligner may then be placed upon the mold and target tooth as a patient would wear their aligner and the resulting forces and moments imparted by the aligner upon the target tooth may be measured. After completing the collection of the force and moment data, the aligner may be remove from the mold and target tooth and the measurement may be repeated a number of times by replacing the aligner upon the assembly. After the measurement has been completed and the data collected, the measured output data may be applied upon the digital model of the scanned assembly where the forces and moments may be transformed into the crown and/or resistance center coordinate systems. In one variation, once the measurement data received from the measurement sensor 16 has been transformed, the transformed data may then be optionally displayed back upon the digital model of the dentition within the treatment planning software platform.

One variation of a system for measuring a force or moment imparted by an orthodontic appliance may generally comprise a dentition mold having one or more target teeth each formed upon a fixture and which is movable independently of the dentition mold, a measurement sensor coupled to the fixture, a processor in communication with the measurement sensor, and an orthodontic appliance configured for placement upon the dentition mold where the orthodontic appliance imparts a force or moment upon the one or more target teeth such that the force or moment is transmitted to the measurement sensor via the fixture for measurement of the force or moment.

One variation of a method of measuring a force or moment imparted by an orthodontic appliance may generally comprise receiving a force or moment imparted by an orthodontic appliance placed upon a dentition mold having one or more target teeth each formed upon a fixture and which is movable independently of the dentition mold, measuring the force or moment via a measurement sensor coupled to the fixture to compile force or moment data, receiving the force or moment data via a processor in communication with the measurement sensor, and transforming the force or moment data from a sensor coordinate system to a second coordinate system.

Another variation of a method of measuring a force or moment imparted by an orthodontic appliance may generally comprise fabricating an orthodontic appliance having one or more target teeth each formed upon a fixture and which is movable independently of the dentition mold, assembling the orthodontic appliance and the one or more target teeth upon a platform of a measurement instrument, scanning the orthodontic appliance and the one or more target teeth to form a digital model assembly, fabricating an orthodontic appliance based on the digital model assembly, positioning the orthodontic appliance upon the one or more target teeth so as to measure the force or moment imparted by the orthodontic appliance to compile force or moment data, and causing the force or moment data to transform from a first coordinate system to a second coordinate system.

DETAILED DESCRIPTION OF THE INVENTION

With treatment planning software, a treatment plan using aligners, brackets, etc. may be used to correct for any number of malocclusions with a patient's teeth. Particular treatment planning processes are described in further detail in U.S. Pat. Nos. 10,624,717; 10,335,250; 10,631,953; 10,357,336; 10,357,342; 10,588,723; 10,548,690, as well as U.S. Pat. Pubs. 2017/0100208; 2019/0321135; 2020/0205936; 2019/0343602; 2020/0170762; 2018/0078343; 2018/0078344; 2018/0078335; 2020/0146775. The details of these references are incorporated herein by reference in their entirety and for any purpose.

As part of the treatment planning, a three-dimensional (3D) digital scan of the patient's dental arch prior to treatment is typically obtained using any number of scanning methodologies and processes. This 3D scan of the dental arch may be used to generate an electronic 3D digital model corresponding to the scanned dentition of the patient. It is this 3D digital model which may be digitally manipulated via a processor or controller within a processing device such as a computer, tablet, etc. for developing a treatment plan upon which one or more orthodontic aligners may be configured for fabrication.

These orthodontic aligners are designed to impart a particular force or moment upon a specified portion of the dentition in order to effect a desired movement of one or more teeth as part of the treatment for correcting malocclusions. However, the aligner which is physically fabricated may impart forces upon the teeth which are not consistent with the level of force intended by design. While the discrepancy may be due to a number of different factors such as material selection, manufacturing errors, etc., the differences between the intended design and the fabricated design are difficult to measure due in part to the complex design of the orthodontic aligner.

Figure 1A:
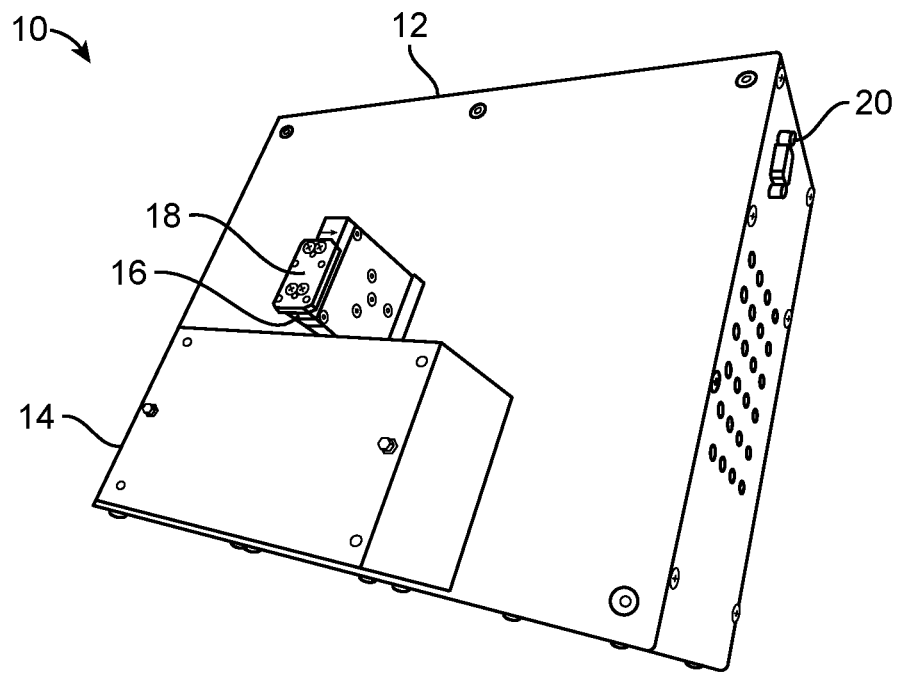
FIGS. 1A and 1B illustrate perspective views of one variation of a measurement instrument for measuring the force and moment loads imparted by an orthodontic aligner.
Figure 1B:
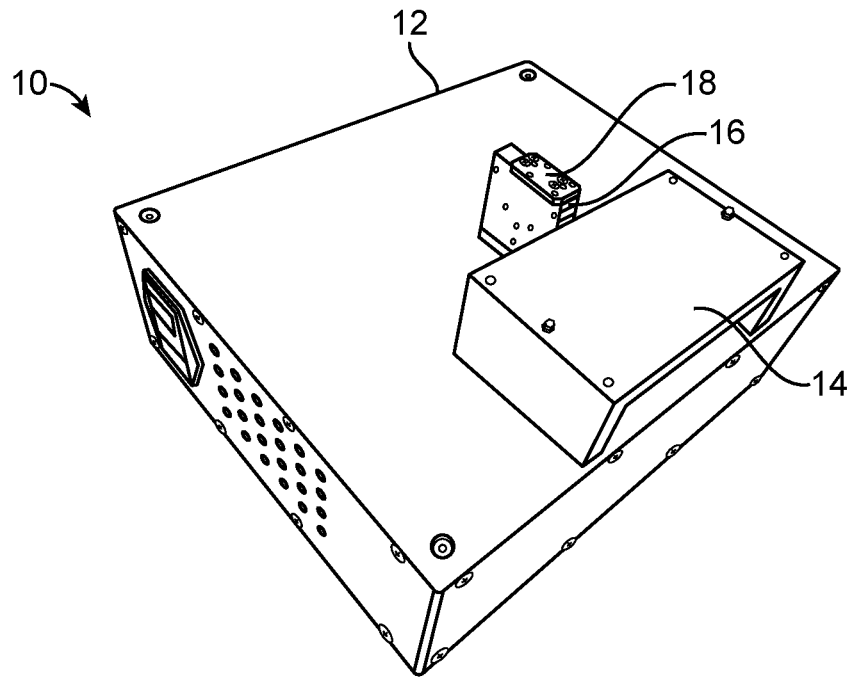

Hence, a force measurement instrument 10 as shown in the perspective views of FIGS. 1A and 1B may be used to measure a force and moment load imparted by an orthodontic appliance such as an aligner, a plurality of brackets and an archwire, or other orthodontic devices upon the dentition in up to six dimensions in space such that the resulting reaction force and moment load of six dimensional output data from the orthodontic appliance may be measured. For example, the force and moment along or around three dimensional axes (X, Y, and Z axes) may be measured, e.g., Fx, Fy, Fz, Mx, My, Mz. This data may be obtained and used to determine whether the shape and movement of a removable or fixed orthodontic appliance such as an aligner conforms to the design intent of the treatment. The measurement of the force and moment can also be transformed to the tooth crown center and resistance center based coordinate systems, as further described herein.

Figure 1C:
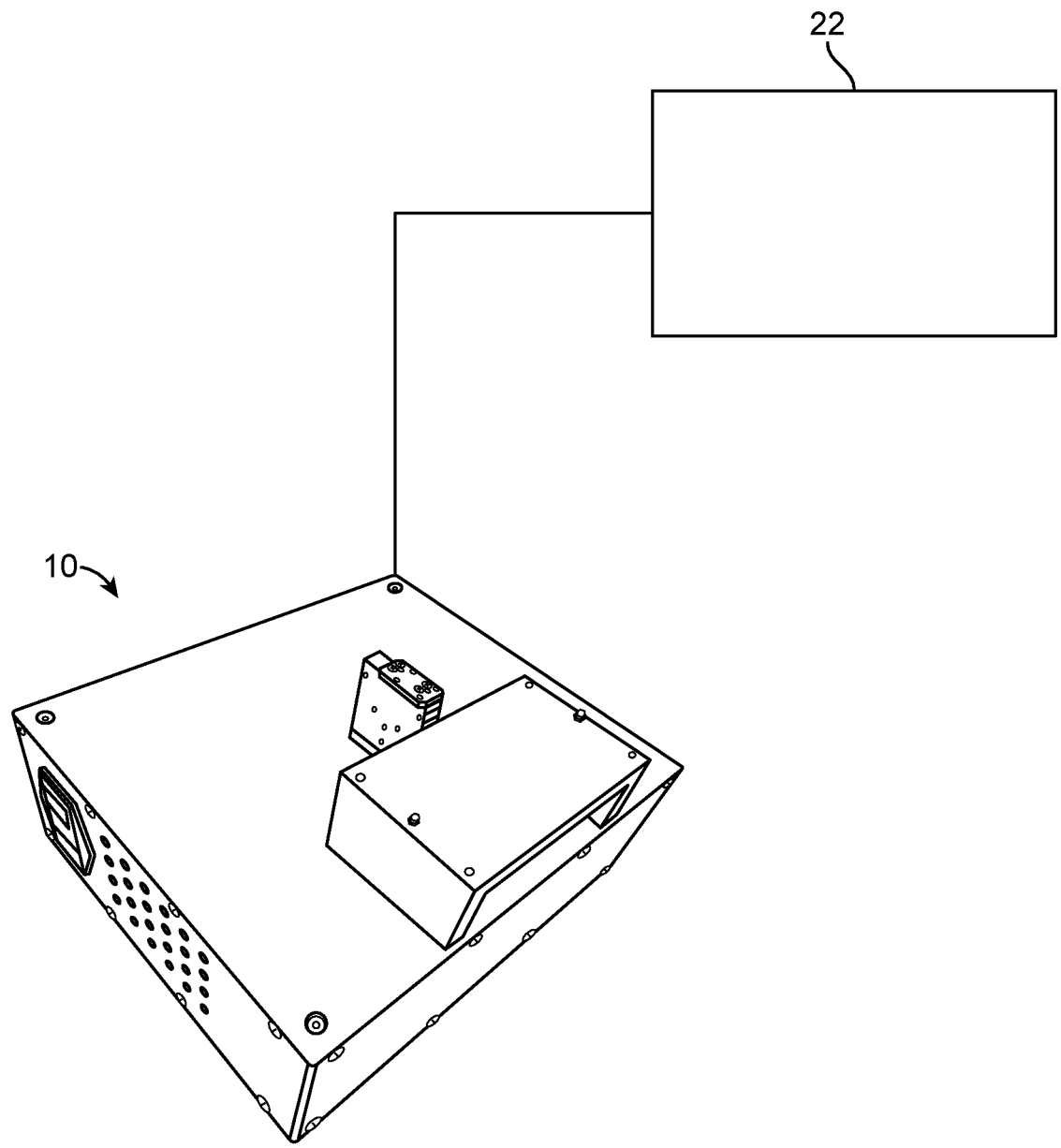
FIG. 1C illustrates an example showing the instrument in communication with another computer, processor, or network, etc. upon which a treatment planning software platform resides which may receive the transmitted output data from the instrument.

As shown, the force measurement instrument 10 may include a housing 12 which encloses a controller or processor and other electronic components such as a memory component within and which supports a platform 14 upon which the orthodontic aligner and arch model may be positioned and supported. A measurement sensor 16 having a target tooth mounting plate 18 positioned upon the measurement sensor 16 may be located adjacent to the platform 14 for providing a secondary platform upon which a force inducing feature may be secured, as described in further detail herein. The instrument 10 may further include an output interface 20 such as a data port (e.g., RS232 data port) which may be used to transmit output data (e.g., Fx, Fy, Fz, Mx, My, Mz six-dimensional data) to another computer, processor, or network, etc. 22 upon which the treatment planning software platform resides which may receive the transmitted output data from the instrument 10, as shown in FIG. 1C.

Figure 2A:
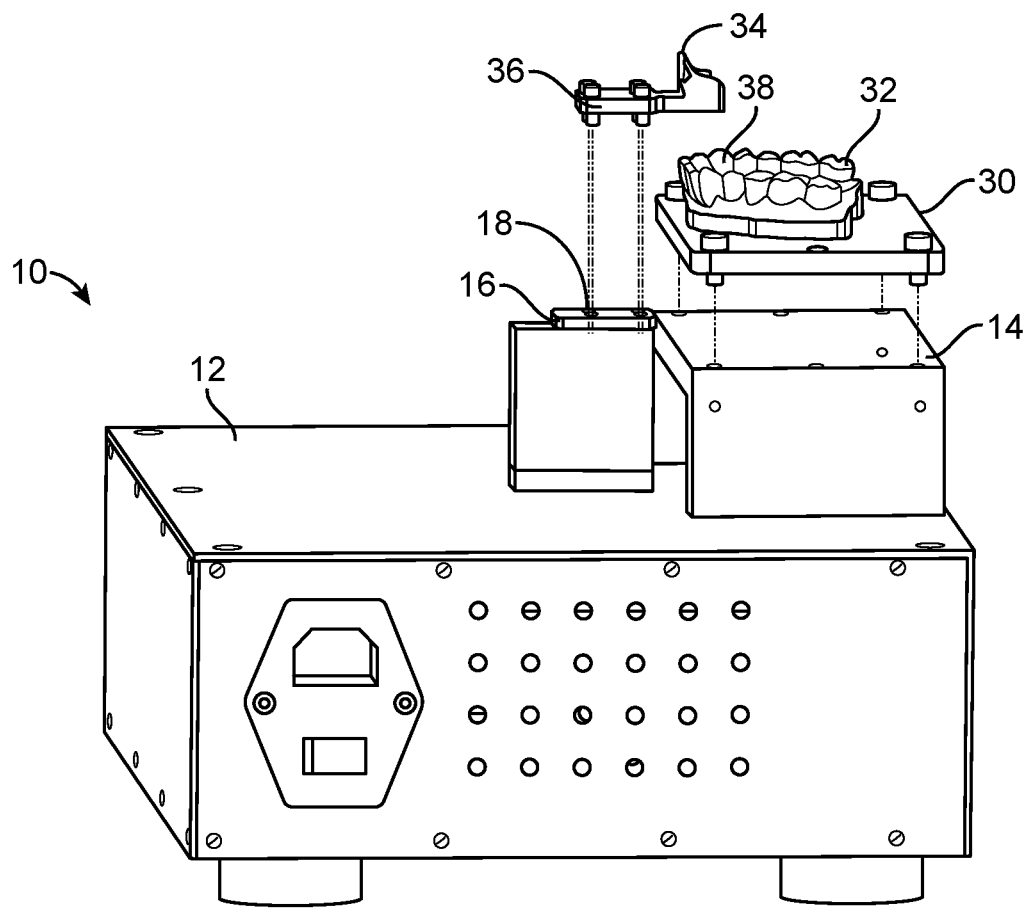
FIGS. 2A and 2B illustrate perspective assembly views of the variation of the measurement instrument and a dentition model formed of a dentition platform.

Generally, in measuring the reaction forces of an orthodontic apparatus such as an aligner, a positive mold of the patient dentition may be fabricated based upon the scanned 3D model where one or more teeth of interest of the dentition may be designated as a target tooth (or teeth) where the resulting forces and moments of the corresponding aligner are to be measured. FIG. 2A shows a perspective assembly view of the instrument 10 and a dentition model formed of a dentition platform 30 having the dentition mold 32 formed upon or otherwise attached and located upon the dentition platform 30. If the strength of the aligner which is designed to be positioned upon the patient's dentition for treatment is to be determined through measurement, at least one selected target tooth 34 of the dentition mold 32 in the region of the aligner to be measured may be designated as the target tooth 34 and fabricated as a separate fixture 36 from the rest of the dentition mold 32. The dentition mold 32 may be representative of a patient's upper teeth or lower teeth and while the entire row may be fabricated, portions of the dentition representing a few number of teeth may instead be used depending upon the desired region for measurement.

Figure 2B:
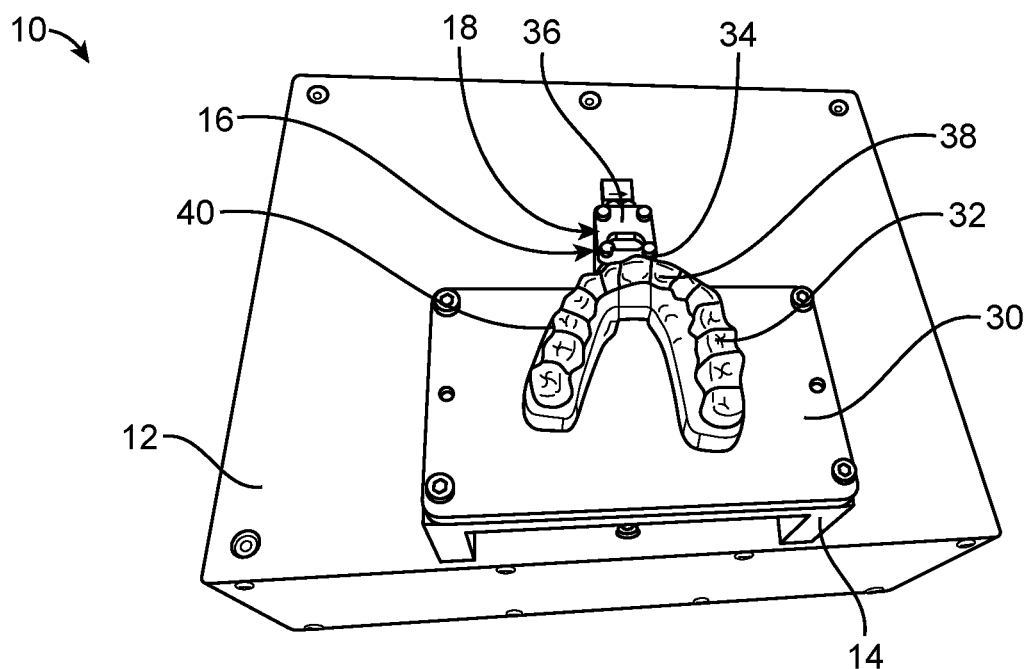

As shown in the perspective views of FIGS. 2A and 2B, the target tooth 34 and fixture 36 may form the complete dentition mold 32 but may be movable independently of the dentition mold 32. The fixture 36 may be slidably positioned along a slot 38 defined within the mold 32 to allow for the movement of the fixture 36 separately from the mold 32. As shown in FIG. 2A, the dentition platform 30 and dentition mold 32 may be secured to the platform 14 using, e.g., one or more fasteners, such that the dentition platform 30 is stationary when attached to the platform 14. The fixture 36 may be attached to the target tooth mounting plate 18 upon the measurement sensor 16 separately from the dentition platform 30 such that the target tooth 34 is aligned within slot 38 defined along the dentition mold 32, as illustrated in FIG. 2B. As the target tooth 34 and fixture 36 are intended to be moved relative to the dentition mold 32, a slight gap may remain between the target tooth 34 and the adjacent teeth along the dentition mold 32, e.g., a gap of about 0.8 mm or less may be defined along each side of the target tooth 34, so that the target tooth 34 and fixture 36 may move unhindered in all dimensions in order to measure the forces from the aligner.

As shown in FIG. 2B, the mold 32 may be formed upon the dentition platform 30 such that the target tooth 34 and fixture 36 may be attached to the target tooth mounting plate 18. Once the target tooth 34 is adequately aligned with the rest of the teeth upon the mold 32, an orthodontic appliance such as an aligner 40 may be placed upon the mold 32 and target tooth 34 to mimic a patient placing their aligner 40 upon their teeth for treatment, as illustrated. With the aligner 40 sufficiently placed upon the mold 32, the aligner 40 may exert upon the target tooth 34 forces and moments which are transmitted through the fixture 36, to the target tooth mounting plate 18, and ultimately to the measurement sensor 16 which may then be used to measure the forces and moments imparted upon the target tooth 34 by the aligner 40. Because of the gap formed between the target tooth 34 and adjacent teeth on the mold 32, the target tooth 34 may move and/or rotate unhindered to ensure a complete force and moment measurement. These measured forces and moments may be compared to the expected forces and moments generated by the digital model of the aligner to see how the actual values compare to the designed and expected values. If the actual values and the expected values are within an acceptable range, this may be an indication that the actual aligner 40 is performing as expected. However, if the actual values and the expected values are outside of an acceptable range, this may be an indication that the fabricated aligner 40 is not performing as expected where the discrepancy may be due to an error in the digital model, the fabrication process of the aligner, the materials used for aligner fabrication, or any number of other factors which may need to be addressed until the discrepancy is resolved.

Figure 2C:
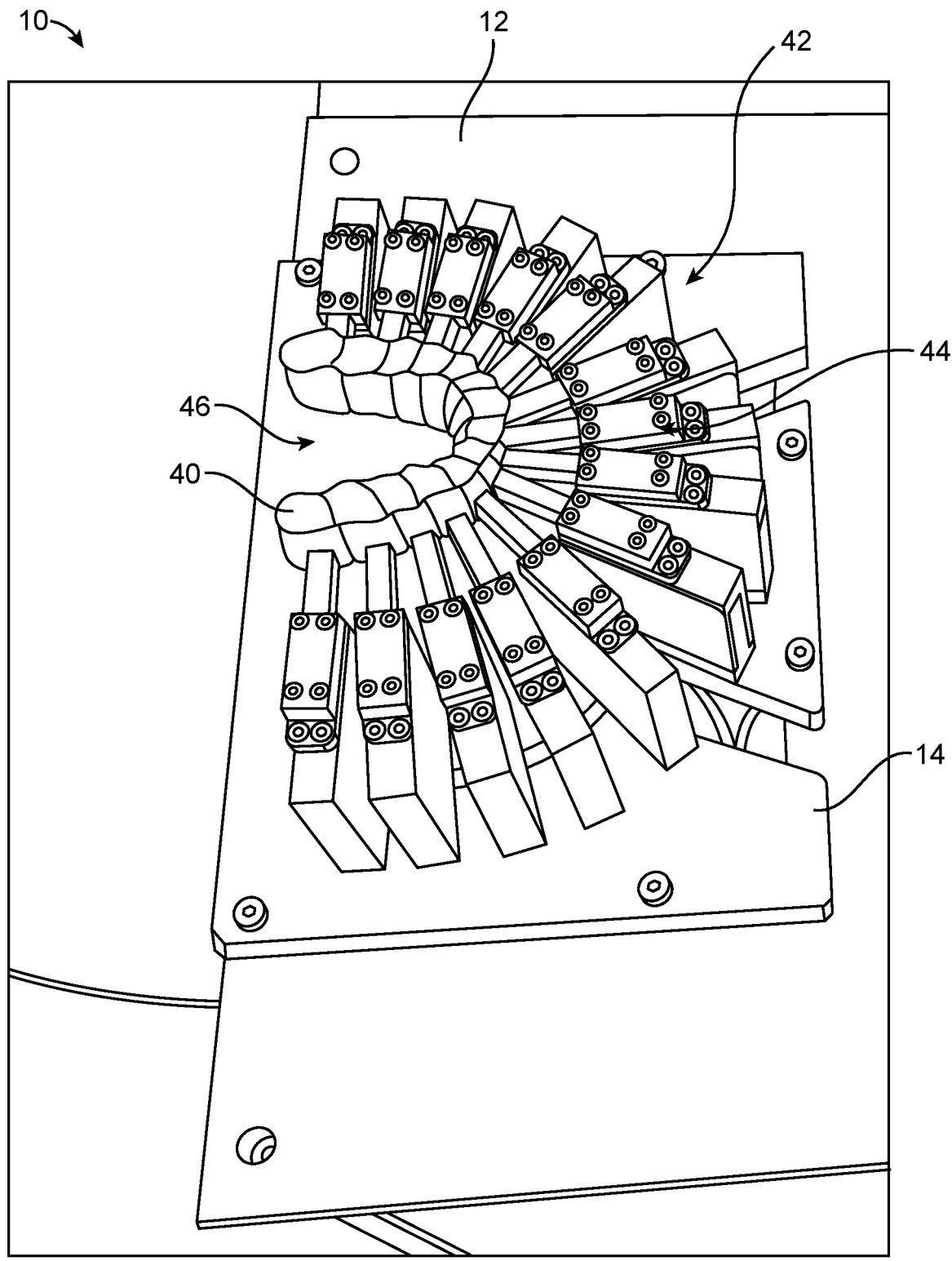
FIG. 2C illustrates yet another variation of the instrument which is configured to measure forces and moments imparted on any of the teeth.

FIG. 2C shows yet another variation of the instrument 10 which is configured to measure forces and moments imparted on any of the teeth. Rather than a singular measurement sensor, multiple measurement sensors 42 may be positioned in a curved pattern to follow the curvature of the dentition mold 46 which may be formed of two or more individual target teeth arranged to be adjacent to one another to follow the curvature and positioning of the patient dentition. In the example shown, each of the individual teeth may be formed to be separated from one another upon the platform 14 while having a respective fixture 44 which may be attached to the mounting plate of a corresponding measurement sensor 42. When each of the individual target teeth are arranged to correspond to the dentition, each target tooth may be connected to the corresponding fixture 44 which is attached to the corresponding measurement sensor 42 which are arranged in the curved or arched configuration. The aligner 40 may be positioned upon the arranged target teeth such that each individual target tooth may measure the forces imparted by the aligner 40.

Figure 3A:
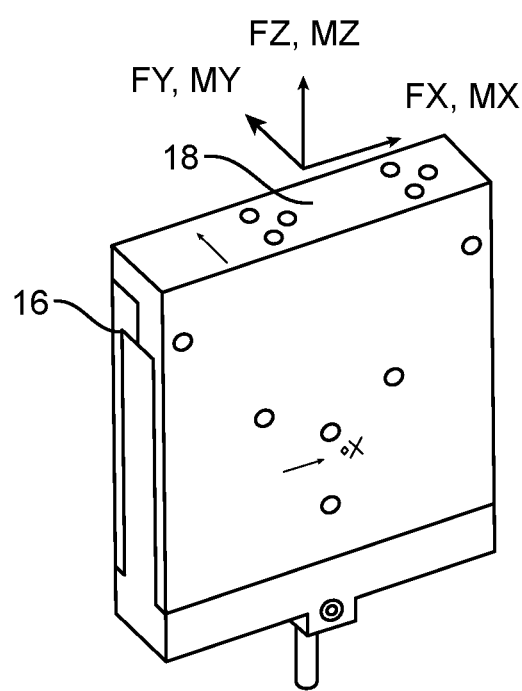
FIGS. 3A and 3B illustrate perspective views of one variation of the measurement sensor and target tooth mounting plate that may be used to attach the target tooth and fixture.
Figure 3B:
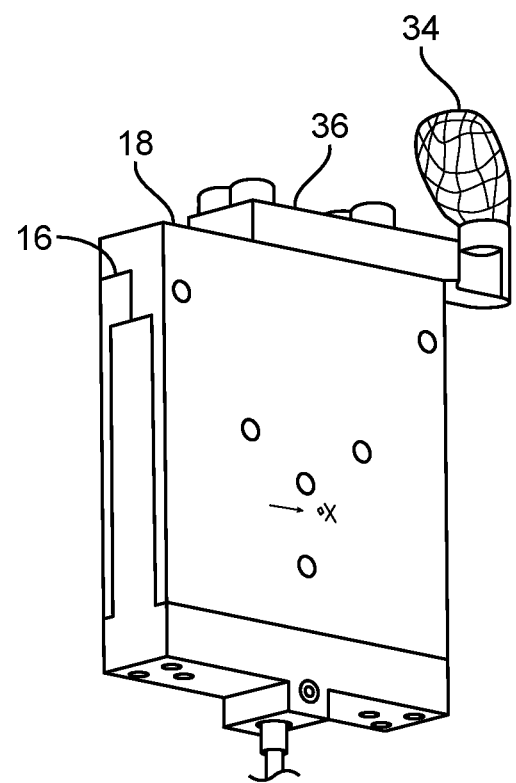

FIGS. 3A and 3B show perspective views of one variation of the measurement sensor 16 and target tooth mounting plate 18 that may be used to attach the target tooth 34 and fixture 36. As shown, the fixture 36 may be attached securely to the mounting plate 18 of the measurement sensor 16 such that the target tooth 34 may extend a distance from the mounting plate 18 for application of the aligner 40. As described, forces and moments applied to the target tooth 34 may be transmitted via the fixture 36 against the mounting plate 18 for measurement by the sensor 16. While the forces and moments may be measured relative to any coordinate system, FIG. 3A shows one example of a reference coordinate system for measuring the forces and moments imparted by the target tooth 34. The measurement sensor 16 may be configured to detect various level of forces and moments while the example shown of the sensor 16 may be configured to detect a maximum of the following values, e.g., 80 N/Nm for forces (Fx, Fy, Fz) along the axes and 1.2 N/Nm for moments (Mx, My, Mz) about the axes.

Figure 4:
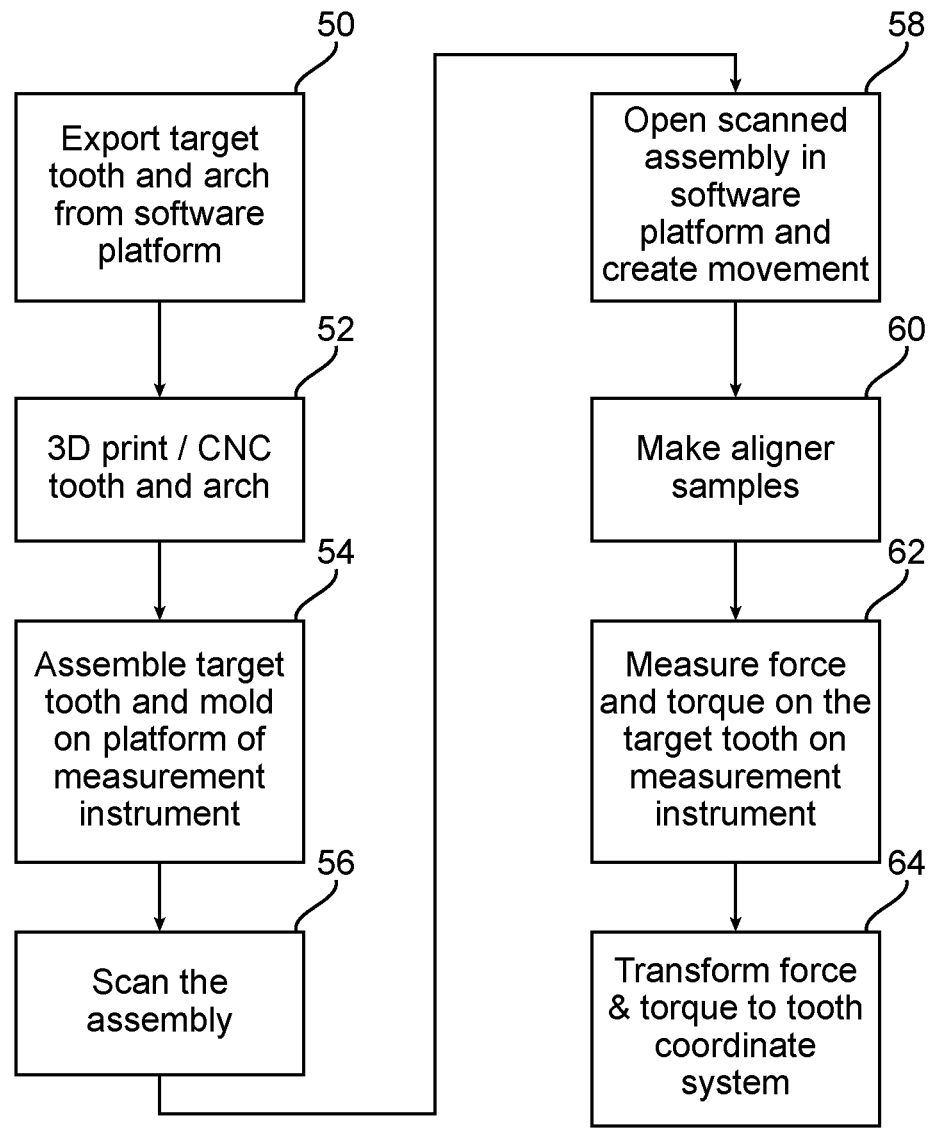
FIG. 4 illustrates a flow diagram showing one variation of the workflow for forming and measuring the target tooth.

FIG. 4 illustrates a flow diagram showing one variation of the workflow for forming and measuring the target tooth 34. Using a treatment planning software platform such as the uDesign treatment planning software (uLab Systems, Inc., San Mateo, CA) for treating orthodontic malocclusions, the digital 3D model of the patient's dentition obtained from scanned images may be exported 50 from the software platform. Other commercially available treatment planning software systems may be used in the alternative as well.

The target tooth 34 may be identified in the software and the target tooth 34, dentition platform 30, and dentition mold 32 may be fabricated 52 from the digital model using, e.g., 3D printing, CNC machining, etc. and then assembled 54 on the platform 14 of the measurement instrument 10. Because of the presence of the gaps between the target tooth 34 and adjacent teeth on the mold 32 once the target tooth 34 is positioned within the slot 38, a filler such as putty may be used to fill the gaps, if needed. The entire assembly of the target tooth 34 and fixture 36 secured on the mounting plate 18 as well as the dentition platform 30 and dentition mold 32 secured upon the platform 14 may then be scanned 56, for example, using an intra-oral scanner or other scanner to create a corresponding 3D digital model. The filler material may be removed from the gaps between the target tooth 34 and mold 32.

The scanned digital model of the assembly may be opened in the software platform 58 where the digital model of the target tooth 34 may be digitally manipulated according to the real position of the target tooth 34 and mold 32. The aligner to be placed upon the target tooth 34 and mold 32 may then be fabricated 60 and any forces or moments imparted on the target tooth 34 when aligned within the slot 38 of the mold 32 (without the aligner 40) may be measured initially and zeroed out to calibrate the sensor 16. The aligner 40 may then be placed upon the mold 32 and target tooth 34 as a patient would wear their aligner and the resulting forces and moments imparted by the aligner 40 upon the target tooth 34 may be measured 62, as described herein. After completing the collection of the force and moment data, the aligner 40 may be remove from the mold 32 and target tooth 34 and the measurement may be repeated a number of times by replacing the aligner 40 upon the assembly. After the measurement has been completed and the data collected, the measured output data may be applied upon the digital model of the scanned assembly where the forces and moments may be transformed into the crown and/or resistance center coordinate systems 64, as described in further detail below.

Figure 5A:
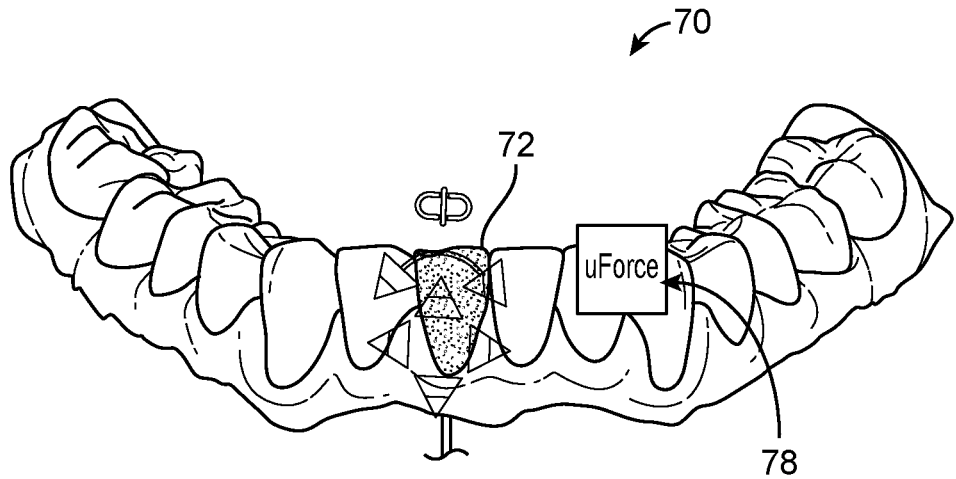
FIG. 5A illustrates an example of a 3D digital model which may be presented by the software platform for treatment planning.
Figure 5B:
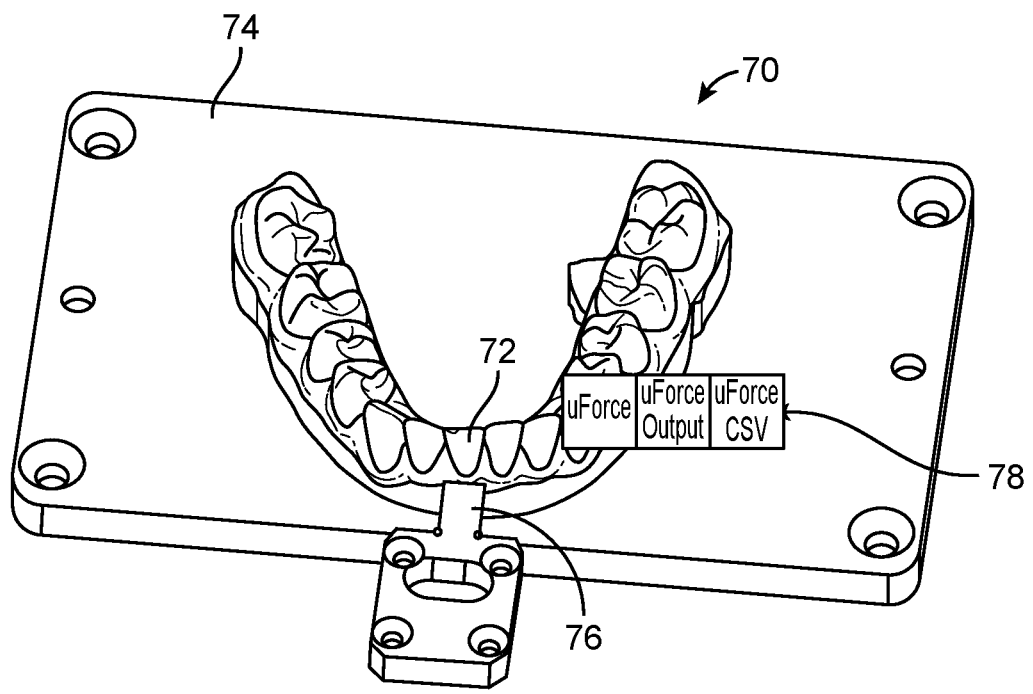
FIG. 5B illustrates the digital model with target tooth as well as a digital representation of the platform and mounting plate from the scanned assembly.

FIG. 5A illustrates an example of a 3D digital model 70 which may be presented by the software platform for treatment planning. The software platform may be used for treatment planning of malocclusions but may also incorporate a feature 78, shown represented by an onscreen menu function, which may incorporate a programmed function for modeling and measuring the forces of a targeted tooth 72, illustrated as a highlighted tooth although any number of teeth may be selected for force measurement. As shown in FIG. 5B, the digital model 70 with target tooth 72 may be displayed, as noted above in step 58, as well as a digital representation of the platform 74 and mounting plate 76 from the scanned assembly, as noted above in step 56.

Figure 5C:
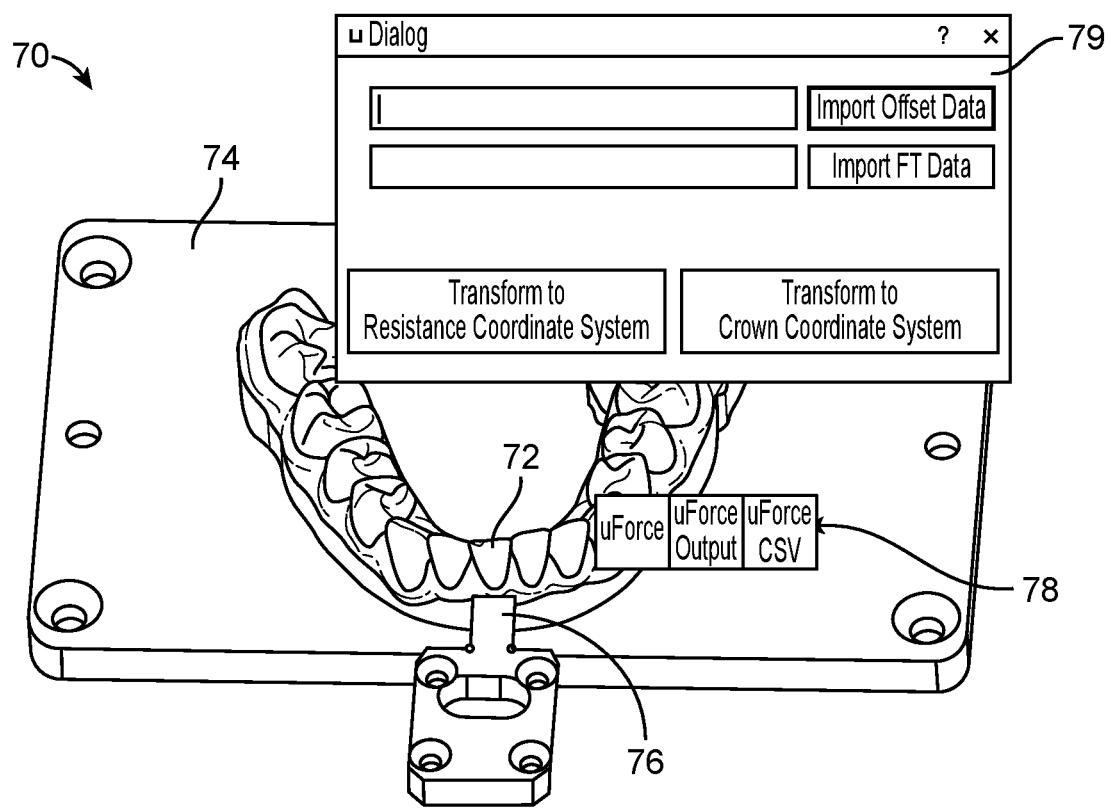
FIG. 5C illustrates how the software platform may be programmed to prompt for input of the measured force and moment data as well as data representing the offset data after the sensor has been zeroed out.

Once the fabricated orthodontic appliance (such as an aligner) has been fabricated and the resulting forces measured, as noted above in step 60, the digital assembly shown in FIG. 5B in the software platform may be programmed to prompt for an output of an STL file to output the conjoined STL and the target STL files. FIG. 5C illustrates how the software platform may be programmed to prompt for input of the measured force and moment data as well as data representing the offset data after the sensor 16 has been zeroed out, as represented by dialog window 79.

Figure 6:
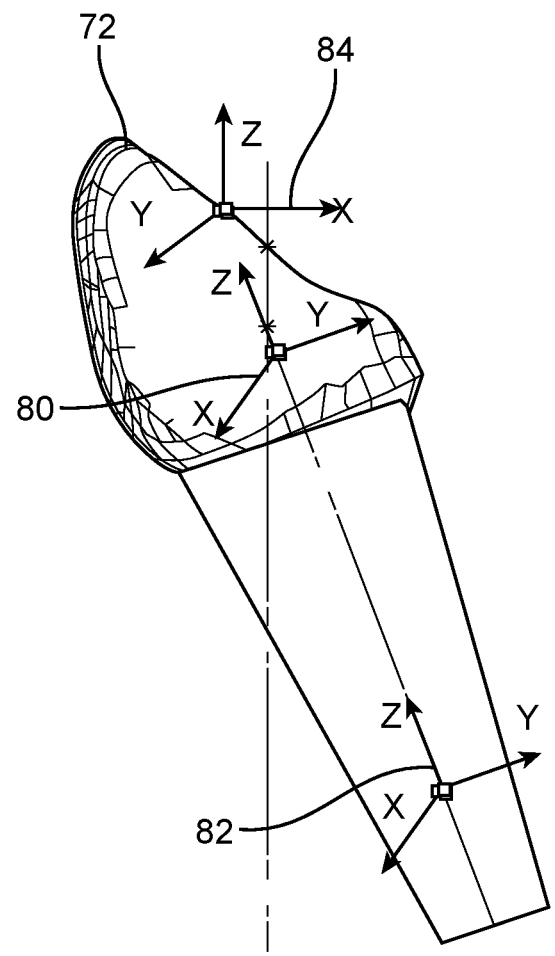
FIG. 6 illustrates a perspective view of a target tooth digital model representation to show the different coordinate systems defined from each tooth or group of teeth which is targeted for measurement of the orthodontic appliance.

The target tooth 72 digital model representation is illustrated in the perspective view of FIG. 6 to show how the force and moment data may be measured relative to different coordinate systems defined from each tooth or group of teeth which is targeted for measurement of the orthodontic appliance. The target tooth 72 is illustrated as a canine tooth as one example showing how the different coordinate systems may be located such as the sensor coordinate system 84 which positions the center of the coordinate system at the location of where the force or moment is imparted. A crown coordinate system 80 may be additionally located at the center of mass of the crown 72 where the x-axis may be defined along a mesial-distal direction such that the x-axis may be tangent, e.g., to a virtual arch wire in the case of a bracket-wire system being modeled. The positive +x direction may extend from a relatively smaller tooth ID to a relatively larger tooth ID. The y-axis may extend along the buccal-lingual direction where the +y axis may extend towards the buccal direction, as shown, and the z-axis may extend along the long axis and is determined by the facial axis of the clinical crown (FACC) direction where the +z axis extends towards the occlusal surface of the crown 72.

Similarly, a resistance coordinate system 82 may be additionally located along a center of resistance of movement at a virtual point along the long axis in the root of the crown 72. As the resistance coordinate system 82 and crown coordinate system 80 may be parallel to one another, the +x axis may extend from a relatively smaller tooth ID to a relatively larger tooth ID, the +y axis may extend towards the buccal direction, and the +z axis may extend towards the occlusal surface of the crown 72. With the coordinate systems defined, the movement of the target tooth may be programmable along any of one or more axes.

Figure 7A:
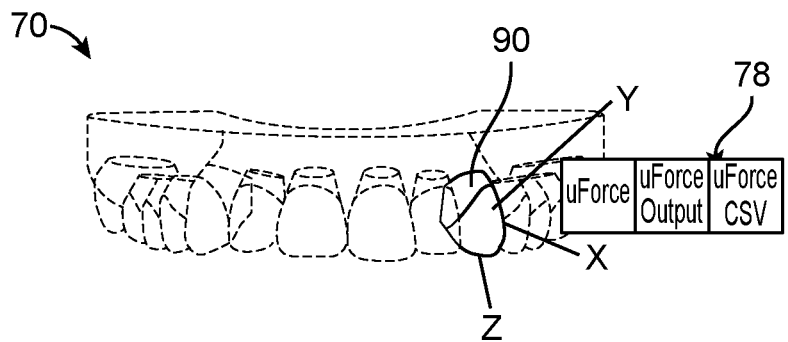
FIGS. 7A to 7D illustrate an example of each canine tooth in each quadrant to show how the crown and resistance coordinate systems may be defined for each tooth.
Figure 7B:
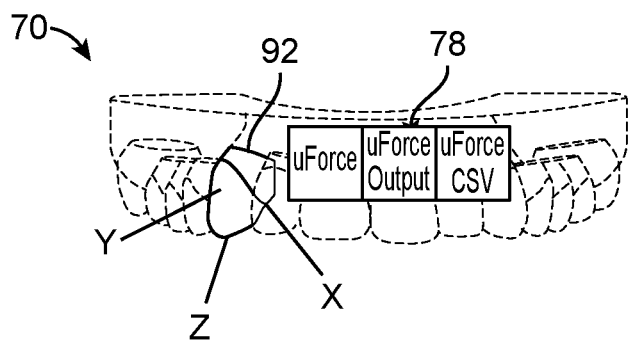
Figure 7C:
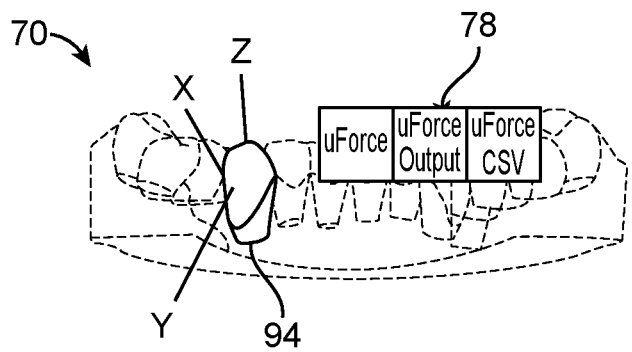
Figure 7D:
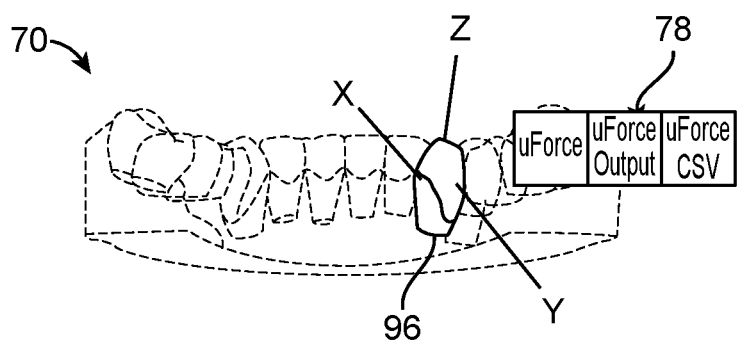

Each target tooth may have its own coordinate axes defined and the direction of each crown and resistance coordinate system for each target tooth may be determined. FIGS. 7A to 7D illustrate an example of each canine tooth in each quadrant to show how the crown and resistance coordinate systems may be defined for each tooth. While this example illustrates the canine teeth, this is intended to be illustrative and any of the one or more teeth may have its own coordinate systems so defined. FIG. 7A shows a first crown 90 along the upper maxillary dentition and FIG. 7B shows a second crown 92 also along the upper maxillary dentition where the x-axes are each defined along the mesial-distal direction, the y-axis are each defined along the buccal-lingual direction towards the buccal surfaces, and the z-axes are defined along the long axis of each crown towards the occlusal surfaces. Likewise, FIG. 7C shows a third crown 94 along the lower mandibular dentition and FIG. 7D shows a fourth crown 96 also along the upper mandibular dentition. Similarly for these crowns, the x-axes are each defined along the mesial-distal direction, the y-axis are each defined along the buccal-lingual direction towards the buccal surfaces, and the z-axes are defined along the long axis of each crown towards the occlusal surfaces.

Figure 8A:
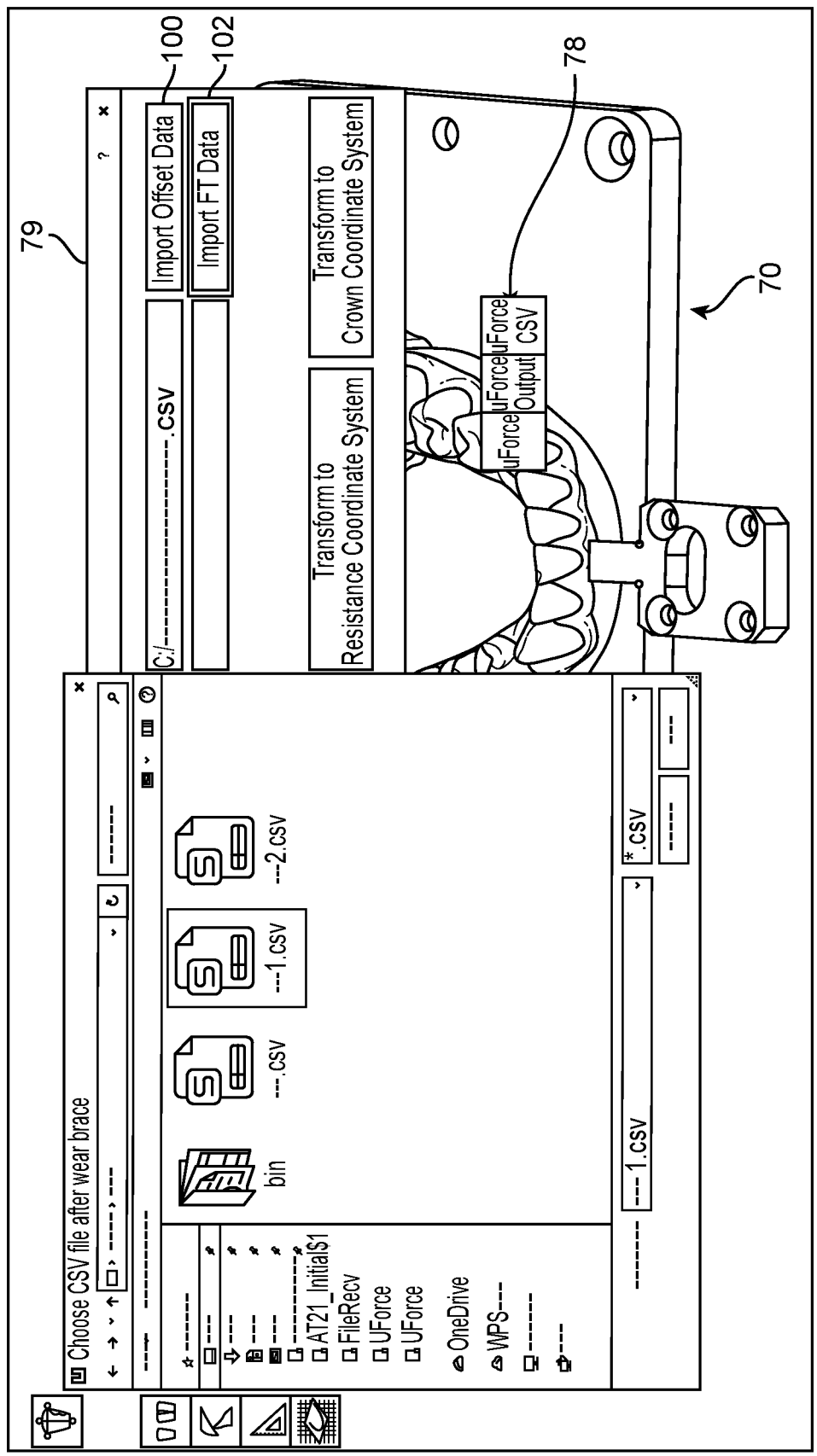
FIGS. 8A and 8B illustrate an example of the user interface for entering the measured sensor data without the oral appliance applied as well as the sensor data with the oral appliance applied to the teeth.
Figure 8B:
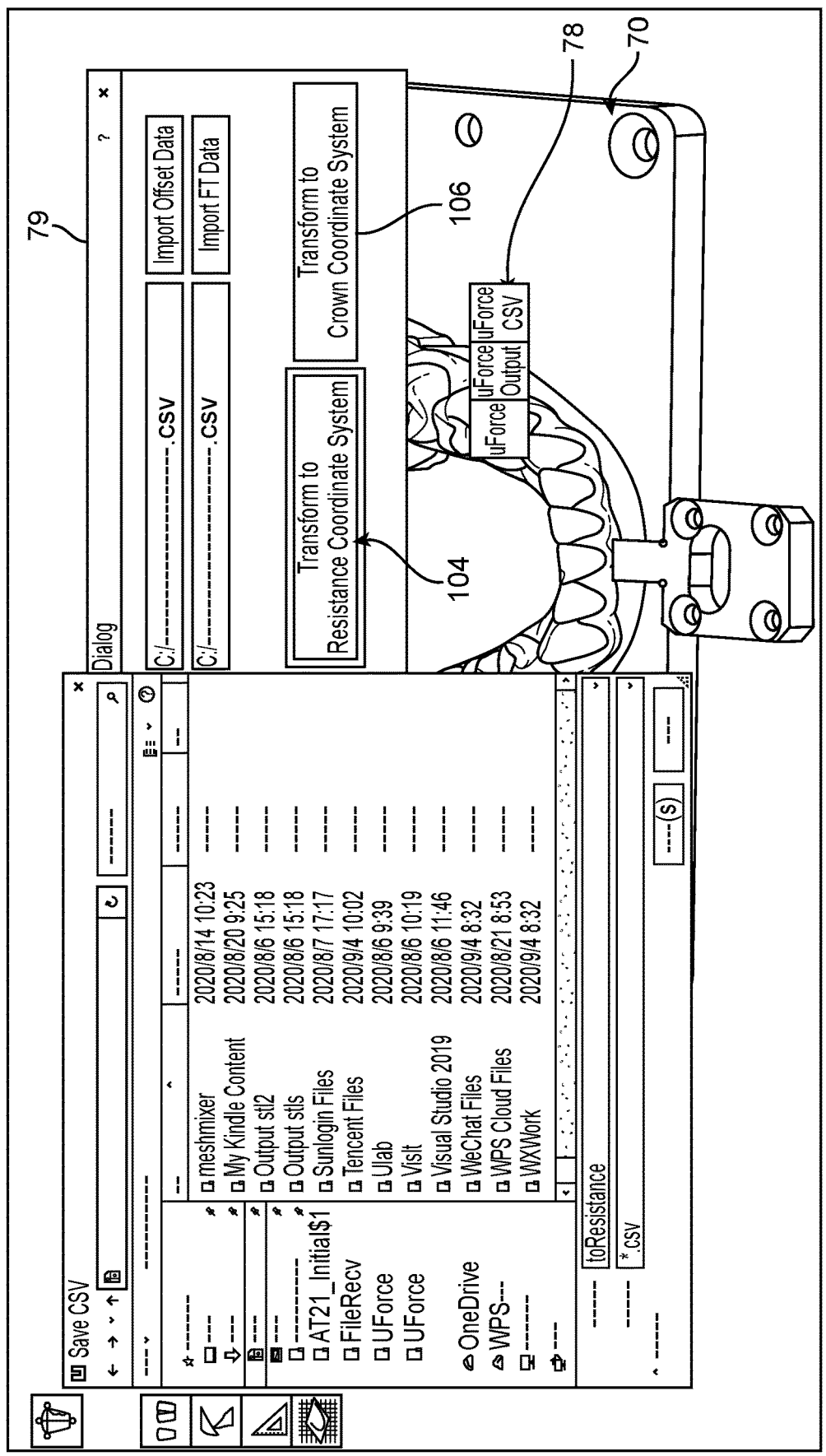

FIGS. 8A and 8B further illustrate an example of the user interface for entering the measured sensor data without the oral appliance applied 100 as well as the sensor data with the oral appliance applied 102 to the teeth. With the measured data entered, the software may be programmed to then transform the data either to the resistance coordinate system 82 using a first function 104 to account for the offset between the resistance coordinate system 82 and sensor coordinate system 84 or to the crown coordinate system 80 using a second function 106 to account for the offset between the crown coordinate system 80 and sensor coordinate system 84. Once the measurement data has been received from the measurement sensor and it has been transformed into either the crown coordinate system 80 or resistance coordinate system 82, the transformed data may be optionally displayed back upon the digital model such as the digital model 70 of the dentition, as shown within the treatment planning software platform, and/or upon a digital representation of the orthodontic appliance.

Figure 9A:
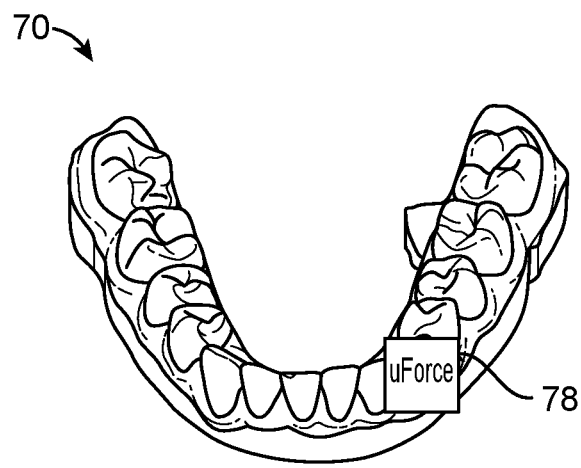
FIGS. 9A and 9B illustrate how the force and moment data feature on the software platform may be deactivated so that the treatment planning may be continued or completed.
Figure 9B:
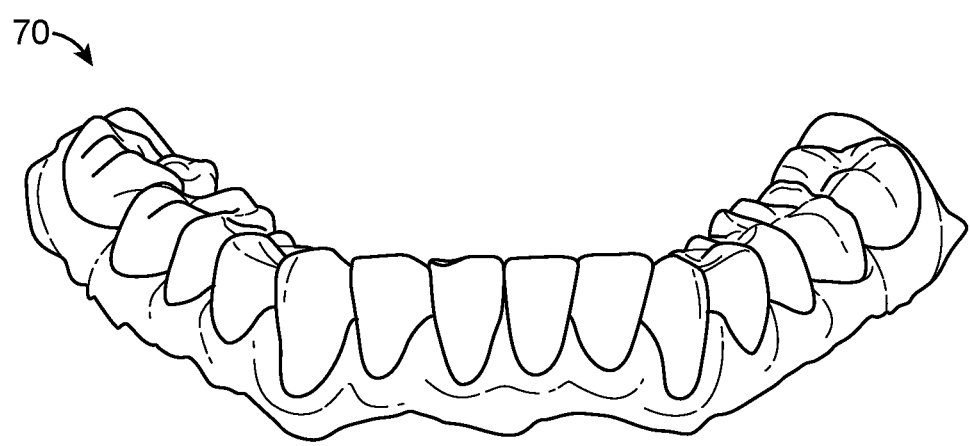

In either case, once the force and moment data has been transformed to the desired coordinate system, the feature 78 on the software platform may be deactivated, as shown in the user interface of FIG. 9A, so that the force measurement feature is removed, as shown in FIG. 9B so that the treatment planning may be continued or completed.

While different features are discussed, the system may incorporate any number of different features into a single system in any number of combinations. A single system provided may, for example, include or incorporate every feature described herein or it may include a select number of features depending upon the desired system.

The applications of the devices and methods discussed above are not limited to the one described but may include any number of further treatment applications. Modification of the above-described assemblies and methods for carrying out the invention, combinations between different variations as practicable, and variations of aspects of the invention that are obvious to those of skill in the art are intended to be within the scope of the claims.

What is claimed is:

1. A system for measuring a force or moment imparted by an orthodontic appliance, comprising:
   a dentition mold having one or more target teeth each formed upon a fixture and which is movable independently of the dentition mold, wherein the dentition mold is formed based upon a scanned dentition of a patient;
   a measurement sensor coupled to the fixture;
   a processor in communication with the measurement sensor; and an orthodontic appliance configured for placement upon the dentition mold where the orthodontic appliance imparts a force or moment upon the one or more target teeth such that the force or moment is transmitted to the measurement sensor via the fixture for measurement of the force or moment, wherein the processor is configured to transform the force or moment data from a sensor coordinate system to a second coordinate system and display the force or moment data which has been transformed upon a digital model of the one or more target teeth of the scanned dentition.

2. The system of claim 1 wherein the dentition mold comprises a plurality of target teeth each formed upon the fixture and which are each movable independently.

3. The system of claim 1 wherein the measurement sensor is configured to measure a force along one or more axes and a moment about the one or more axes.

4. The system of claim 1 wherein the orthodontic appliance comprises an aligner configured for placement upon the one or more target teeth.

5. The system of claim 1 wherein the orthodontic appliance comprises a plurality of brackets and an archwire.

6. The system of claim 1 further comprising a computer having a resident orthodontic treatment planning software in communication with the processor for receiving force or moment data detected via the measurement sensor.

7. The system of claim 1 wherein the second coordinate system comprises a crown coordinate system or resistance coordinate system.

8. A method of measuring a force or moment imparted by an orthodontic appliance, comprising:
   scanning a dentition mold having one or more target teeth and a fixture;
   receiving a force or moment imparted by an orthodontic appliance placed upon the dentition mold having the one or more target teeth each formed upon the fixture and which is movable independently of the dentition mold;
   measuring the force or moment via a measurement sensor coupled to the fixture to compile force or moment data;
   receiving the force or moment data via a processor in communication with the measurement sensor;
   transforming the force or moment data from a sensor coordinate system to a second coordinate system; and
   displaying the force or moment data which has been transformed upon a digital model of the one or more target teeth of the scanned dentition mold.

9. The method of claim 8 wherein measuring the force or moment comprises measuring the force along one or more axes and the moment about the one or more axes.

10. The method of claim 8 wherein the orthodontic appliance comprises an aligner configured for placement upon the one or more target teeth.

11. The method of claim 8 wherein the orthodontic appliance comprises a plurality of brackets and an archwire.

12. The method of claim 8 wherein receiving the force or moment data comprises receiving the force or moment data via a computer having a resident orthodontic treatment planning software in communication with the processor.

13. The method of claim 8 wherein the second coordinate system comprises a crown coordinate system or resistance coordinate system.

14. A method of measuring a force or moment imparted by an orthodontic appliance, comprising:
   fabricating a dentition mold having one or more target teeth each formed upon a fixture and which is movable independently of the dentition mold;
   assembling an orthodontic appliance and the dentition mold having the one or more target teeth upon a platform of a measurement instrument;
   scanning the dentition mold having and the one or more target teeth to form a digital model assembly;
   fabricating an orthodontic appliance based on the digital model assembly;
   positioning the orthodontic appliance upon the one or more target teeth so as to measure the force or moment imparted by the orthodontic appliance to compile force or moment data;
   causing the force or moment data to transform from a first coordinate system to a second coordinate system; and
   displaying the force or moment data which has been transformed upon a digital model of the one or more target teeth of the scanned dentition mold.

15. The method of claim 14 wherein transforming the force or moment data comprises transforming the force or moment data from a sensor coordinate system to the second coordinate system.

16. The method of claim 15 wherein the second coordinate system comprises a crown coordinate system or resistance coordinate system.

* * * * *